United States Patent
Farris et al.

(10) Patent No.: US 7,830,860 B2
(45) Date of Patent: *Nov. 9, 2010

(54) PACKET DATA NETWORK VOICE CALL QUALITY MONITORING

(75) Inventors: Robert D. Farris, Sterling, VA (US); Eric A. Voit, Baltimore, MD (US)

(73) Assignee: Verizon Services Corp., Ashburn, VA (US)

( * ) Notice: Subject to any disclaimer, the term of this patent is extended or adjusted under 35 U.S.C. 154(b) by 807 days.

This patent is subject to a terminal disclaimer.

(21) Appl. No.: 10/442,414

(22) Filed: May 21, 2003

(65) Prior Publication Data

US 2003/0198218 A1 Oct. 23, 2003

Related U.S. Application Data

(63) Continuation of application No. 08/815,361, filed on Mar. 11, 1997, now Pat. No. 6,574,216.

(51) Int. Cl.
*H04L 12/66* (2006.01)
(52) U.S. Cl. .................. 370/352; 370/237; 370/401
(58) Field of Classification Search ......... 370/237–238, 370/352–356, 401
See application file for complete search history.

(56) References Cited

U.S. PATENT DOCUMENTS

| | | |
|---|---|---|
| 4,054,756 A | 10/1977 | Comella et al. |
| 4,100,377 A | 7/1978 | Flanagan |
| 4,191,860 A | 3/1980 | Weber |
| 4,201,891 A | 5/1980 | Lawrence et al. |
| 4,313,036 A | 1/1982 | Jabara et al. |
| 4,375,097 A | 2/1983 | Ulug |
| 4,630,262 A | 12/1986 | Callens |
| 4,652,700 A | 3/1987 | Matthews et al. |
| 4,653,045 A | 3/1987 | Stanley et al. |
| 4,679,190 A | 7/1987 | Dias et al. |

(Continued)

FOREIGN PATENT DOCUMENTS

EP 0235257 2/1987

(Continued)

OTHER PUBLICATIONS

Weisser et al., "The Intelligent Network and Forward-Looking Technology" IEEE Communications Magazine, Dec. 1988, pp. 64-69.

(Continued)

*Primary Examiner*—Frank Duong

(57) ABSTRACT

The quality of service existing in a data packet network during the course of communication of a voice call through a data network, such as the Internet, is monitored. A minimum acceptable level of service may be predefined with a threshold quality level stored in the user's Call Processing Record (CPR) in the AIN Integrated Services Control Point (ISCP). If the monitored quality is maintained in excess of the stored threshold, communication of the call continues through the established course of transmission. If the measured quality of service on the data network is not satisfactory, the routing of the call is changed to communication solely through a voice telephone network connection, which may include an Interexchange Carrier link, without terminating the call. The packet data network is thereby bypassed to obtain voice grade quality while maintaining the call.

14 Claims, 6 Drawing Sheets

U.S. PATENT DOCUMENTS

| | | |
|---|---|---|
| 4,685,125 A | 8/1987 | Zave |
| 4,713,806 A | 12/1987 | Oberlander et al. |
| 4,718,005 A | 1/1988 | Feigenbaum et al. |
| 4,730,071 A | 3/1988 | Schoenthal |
| 4,741,820 A | 5/1988 | Coughlin |
| 4,747,130 A | 5/1988 | Ho |
| 4,765,924 A | 8/1988 | Inoue |
| 4,782,485 A | 11/1988 | Gollub |
| 4,821,034 A | 4/1989 | Anderson et al. |
| 4,827,500 A | 5/1989 | Binkerd et al. |
| 4,865,763 A | 9/1989 | Inoue |
| 4,866,763 A | 9/1989 | Cooper et al. |
| 4,872,157 A | 10/1989 | Hemmady |
| 4,872,159 A | 10/1989 | Hemmady |
| 4,872,160 A | 10/1989 | Hemmady et al. |
| 4,875,206 A | 10/1989 | Nichols |
| 4,877,949 A | 10/1989 | Danielson |
| 4,882,476 A | 11/1989 | White |
| 4,893,302 A | 1/1990 | Hemmady et al. |
| 4,894,824 A | 1/1990 | Hemmady |
| 4,899,333 A | 2/1990 | Roediger |
| 4,910,794 A | 3/1990 | Mahany |
| 4,922,486 A | 5/1990 | Lidinsky |
| 4,933,931 A | 6/1990 | Kokubo |
| 4,942,574 A | 7/1990 | Zelle |
| 4,958,341 A | 9/1990 | Hemmady et al. |
| 4,979,206 A | 12/1990 | Padden et al. |
| 4,996,707 A | 2/1991 | O'Malley et al. |
| D315,573 S | 3/1991 | Schultz |
| 5,008,926 A | 4/1991 | Misholi |
| 5,009,337 A | 4/1991 | Bimbi |
| 5,012,511 A | 4/1991 | Hanle et al. |
| 5,019,699 A | 5/1991 | Koenck |
| 5,023,868 A | 6/1991 | Davidson |
| 5,025,254 A | 6/1991 | Hess |
| 5,029,196 A | 7/1991 | Morganstein |
| 5,029,199 A | 7/1991 | Jones et al. |
| 5,031,098 A | 7/1991 | Miller |
| 5,052,020 A | 9/1991 | Koenck |
| 5,052,943 A | 10/1991 | Davis |
| 5,065,393 A | 11/1991 | Sibbitt et al. |
| 5,068,888 A | 11/1991 | Scherk et al. |
| 5,070,536 A | 12/1991 | Mahany |
| 5,098,877 A | 3/1992 | Coughlin |
| 5,107,492 A | 4/1992 | Roux et al. |
| 5,113,499 A | 5/1992 | Ankney et al. |
| 5,115,431 A | 5/1992 | Williams |
| 5,115,495 A | 5/1992 | Tsuchiya et al. |
| 5,123,064 A | 6/1992 | Hacker |
| 5,144,282 A | 9/1992 | Sutterlin |
| 5,146,488 A | 9/1992 | Okada et al. |
| 5,157,390 A | 10/1992 | Yoshie et al. |
| 5,157,662 A | 10/1992 | Tadamura et al. |
| 5,159,592 A | 10/1992 | Perkins |
| 5,159,624 A | 10/1992 | Makita |
| 5,164,938 A | 11/1992 | Jurkevich et al. |
| 5,180,232 A | 1/1993 | Chadima |
| 5,193,110 A | 3/1993 | Jones et al. |
| 5,195,085 A | 3/1993 | Bertsch et al. |
| 5,195,086 A | 3/1993 | Baumgartner et al. |
| 5,195,128 A | 3/1993 | Knitl |
| 5,195,183 A | 3/1993 | Miller |
| 5,199,062 A | 3/1993 | Von Meister et al. |
| 5,200,993 A | 4/1993 | Wheeler et al. |
| 5,202,817 A | 4/1993 | Koenck |
| 5,202,825 A | 4/1993 | Miller |
| 5,204,894 A | 4/1993 | Darden |
| 5,206,901 A | 4/1993 | Harlow et al. |
| 5,208,848 A | 5/1993 | Pula |
| 5,215,011 A | 6/1993 | Monney |
| 5,216,233 A | 6/1993 | Main |
| 5,218,187 A | 6/1993 | Koenck |
| 5,218,188 A | 6/1993 | Hanson |
| 5,223,699 A | 6/1993 | Flynn et al. |
| 5,223,820 A | 6/1993 | Sutterlin |
| 5,225,071 A | 7/1993 | Coughlin |
| 5,226,075 A | 7/1993 | Funk et al. |
| 5,227,614 A | 7/1993 | Danielson |
| 5,231,492 A | 7/1993 | Dangi et al. |
| 5,235,317 A | 8/1993 | Sutterlin |
| 5,237,604 A | 8/1993 | Ryan |
| 5,241,588 A | 8/1993 | Babso et al. |
| 5,243,645 A | 9/1993 | Bissell et al. |
| 5,243,654 A | 9/1993 | Hunter |
| 5,247,571 A | 9/1993 | Key et al. |
| 5,254,971 A | 10/1993 | Sutterlin |
| 5,260,986 A | 11/1993 | Pershan |
| 5,263,080 A | 11/1993 | Jones et al. |
| 5,265,155 A | 11/1993 | Castro |
| 5,272,749 A | 12/1993 | Masek |
| 5,274,696 A | 12/1993 | Perelman |
| 5,280,159 A | 1/1994 | Schultz |
| 5,287,199 A | 2/1994 | Zoccolillo |
| 5,289,378 A | 2/1994 | Miller |
| 5,289,468 A | 2/1994 | Yoshida |
| 5,295,154 A | 3/1994 | Meier |
| 5,303,297 A | 4/1994 | Durrell et al. |
| 5,305,181 A | 4/1994 | Schultz |
| 5,308,966 A | 5/1994 | Danielson |
| 5,309,437 A | 5/1994 | Perlman et al. |
| 5,311,583 A | 5/1994 | Friedes et al. |
| 5,313,053 A | 5/1994 | Koenck |
| 5,317,566 A | 5/1994 | Joshi |
| 5,317,691 A | 5/1994 | Traeger |
| 5,318,719 A | 6/1994 | Hughes |
| 5,322,991 A | 6/1994 | Hanson |
| 5,325,421 A | 6/1994 | Hou et al. |
| 5,327,421 A | 7/1994 | Hiller et al. |
| 5,327,486 A | 7/1994 | Wolff et al. |
| 5,329,520 A | 7/1994 | Richardson |
| 5,329,578 A | 7/1994 | Brennan et al. |
| 5,331,580 A | 7/1994 | Miller |
| 5,333,266 A | 7/1994 | Boaz |
| 5,341,374 A | 8/1994 | Lewen et al. |
| 5,345,446 A | 9/1994 | Hiller et al. |
| 5,346,611 A | 9/1994 | Coughlin |
| 5,347,633 A | 9/1994 | Ashfield et al. |
| 5,349,497 A | 9/1994 | Hanson |
| 5,349,678 A | 9/1994 | Morris |
| 5,351,286 A | 9/1994 | Nici |
| 5,353,331 A | 10/1994 | Emery et al. |
| 5,359,185 A | 10/1994 | Hanson |
| 5,361,256 A | 11/1994 | Doeringer et al. |
| 5,365,524 A | 11/1994 | Hiller et al. |
| 5,365,546 A | 11/1994 | Koenck |
| 5,367,566 A | 11/1994 | Moe et al. |
| 5,371,858 A | 12/1994 | Miller |
| 5,375,068 A | 12/1994 | Palmer et al. |
| 5,375,159 A | 12/1994 | Williams |
| 5,377,186 A | 12/1994 | Wegner et al. |
| 5,381,465 A | 1/1995 | Carter et al. |
| 5,384,831 A | 1/1995 | Creswell et al. |
| 5,384,840 A | 1/1995 | Blatchford et al. |
| 5,386,467 A | 1/1995 | Ahmad |
| 5,390,175 A | 2/1995 | Hiller et al. |
| 5,390,335 A | 2/1995 | Stephan et al. |
| 5,392,344 A | 2/1995 | Ash et al. |
| 5,392,402 A | 2/1995 | Robrock |
| 5,394,436 A | 2/1995 | Meier |
| 5,396,542 A | 3/1995 | Alger et al. |
| 5,400,393 A | 3/1995 | Knuth |
| 5,402,478 A | 3/1995 | Hluchyj et al. |
| 5,406,557 A | 4/1995 | Baudoin |
| 5,408,237 A | 4/1995 | Patterson |

| | | | | | |
|---|---|---|---|---|---|
| 5,408,382 A | 4/1995 | Schultz | 5,513,127 A | 4/1996 | Gard et al. |
| 5,410,141 A | 4/1995 | Koenck | 5,515,303 A | 5/1996 | Cargin, Jr. |
| 5,410,754 A | 4/1995 | Klotzbach et al. | 5,517,434 A | 5/1996 | Hanson |
| 5,416,842 A | 5/1995 | Aziz | 5,517,560 A | 5/1996 | Greenspan |
| 5,418,844 A | 5/1995 | Morrisey et al. | 5,520,796 A | 5/1996 | Chen et al. |
| 5,420,211 A | 5/1995 | Hughes | 5,521,370 A | 5/1996 | Hanson |
| 5,420,916 A | 5/1995 | Sekiguchi | 5,521,719 A | 5/1996 | Yamada |
| 5,422,882 A | 6/1995 | Hiller et al. | 5,521,924 A | 5/1996 | Kakuma et al. |
| 5,422,940 A | 6/1995 | Endo et al. | 5,524,137 A | 6/1996 | Rhee |
| 5,422,941 A | 6/1995 | Hasenauer et al. | 5,524,145 A | 6/1996 | Parker |
| 5,425,028 A | 6/1995 | Britton et al. | 5,526,353 A | 6/1996 | Henley et al. |
| 5,425,051 A | 6/1995 | Mahany | 5,526,416 A | 6/1996 | Dezonno et al. |
| 5,425,085 A | 6/1995 | Weinberger et al. | 5,526,489 A | 6/1996 | Nilakantan et al. |
| 5,425,090 A | 6/1995 | Orriss | 5,528,539 A | 6/1996 | Ong |
| 5,425,091 A | 6/1995 | Josephs | 5,530,744 A | 6/1996 | Charalambous et al. |
| 5,425,780 A | 6/1995 | Flatt et al. | 5,530,852 A | 6/1996 | Mesk et al. |
| 5,426,636 A | 6/1995 | Hiller et al. | 5,537,470 A | 7/1996 | Lee |
| 5,428,608 A | 6/1995 | Freeman et al. | 5,539,193 A | 7/1996 | Gibbs |
| 5,428,636 A | 6/1995 | Meier | 5,539,194 A | 7/1996 | Miller |
| 5,430,719 A | 7/1995 | Weisser et al. | 5,539,884 A | 7/1996 | Robrock, II |
| 5,430,727 A | 7/1995 | Callon | 5,539,886 A | 7/1996 | Aldred et al. |
| 5,434,852 A | 7/1995 | La Porta et al. | 5,541,398 A | 7/1996 | Hanson |
| 5,434,913 A | 7/1995 | Tung et al. | 5,541,917 A | 7/1996 | Farris |
| 5,436,957 A | 7/1995 | McConnell | 5,541,927 A | 7/1996 | Kristol et al. |
| 5,436,963 A | 7/1995 | Fitzpatrick et al. | 5,541,930 A | 7/1996 | Klingman |
| 5,440,563 A | 8/1995 | Isidoro et al. | 5,544,010 A | 8/1996 | Schultz |
| 5,440,620 A | 8/1995 | Slusky | 5,551,025 A | 8/1996 | O'Reilly et al. |
| 5,440,621 A | 8/1995 | Castro | 5,551,035 A | 8/1996 | Arnold et al. |
| 5,442,690 A | 8/1995 | Nazif et al. | 5,555,276 A | 9/1996 | Koenck |
| 5,444,709 A | 8/1995 | Riddle | 5,559,068 A | 9/1996 | Chen |
| 5,448,633 A | 9/1995 | Jamaleddin et al. | 5,559,721 A | 9/1996 | Ishii |
| 5,450,411 A | 9/1995 | Heil | 5,559,871 A | 9/1996 | Smith |
| 5,452,289 A | 9/1995 | Sharma et al. | 5,561,670 A | 10/1996 | Hoffert et al. |
| 5,452,297 A | 9/1995 | Hiller et al. | 5,563,882 A | 10/1996 | Bruno et al. |
| 5,452,350 A | 9/1995 | Reynolds et al. | 5,568,645 A | 10/1996 | Morris |
| 5,455,821 A | 10/1995 | Schaeffer et al. | 5,572,583 A | 11/1996 | Wheeler, Jr. et al. |
| 5,457,629 A | 10/1995 | Miller | 5,575,961 A | 11/1996 | Smyk |
| 5,459,775 A | 10/1995 | Isono et al. | 5,576,529 A | 11/1996 | Koenck |
| 5,461,611 A | 10/1995 | Drak et al. | 5,579,472 A | 11/1996 | Keyworth et al. |
| 5,463,677 A | 10/1995 | Bash et al. | 5,583,564 A | 12/1996 | Rao |
| 5,465,207 A | 11/1995 | Boatwright | 5,583,920 A | 12/1996 | Wheeler, Jr. |
| 5,466,170 A | 11/1995 | Pavek | 5,583,926 A | 12/1996 | Venier et al. |
| 5,468,947 A | 11/1995 | Danielson | 5,583,929 A | 12/1996 | Ardon |
| 5,468,950 A | 11/1995 | Hanson | 5,586,175 A | 12/1996 | Hogan |
| 5,469,496 A | 11/1995 | Emery et al. | 5,586,177 A | 12/1996 | Farris et al. |
| 5,469,497 A | 11/1995 | Pierce et al. | 5,587,577 A | 12/1996 | Schultz |
| 5,469,500 A | 11/1995 | Satter et al. | 5,590,127 A | 12/1996 | Bales et al. |
| 5,473,608 A | 12/1995 | Gagne et al. | 5,590,133 A | 12/1996 | Billstrom et al. |
| 5,473,677 A | 12/1995 | D'Amato et al. | 5,590,181 A | 12/1996 | Hogan |
| 5,475,732 A | 12/1995 | Pester, III | 5,590,346 A | 12/1996 | West |
| 5,475,737 A | 12/1995 | Gamer et al. | 5,594,717 A | 1/1997 | Watanabe et al. |
| 5,475,748 A | 12/1995 | Jones | 5,594,769 A | 1/1997 | Pellegrino et al. |
| 5,475,817 A | 12/1995 | Waldo et al. | 5,594,784 A | 1/1997 | Velius |
| 5,477,531 A | 12/1995 | McKee et al. | 5,594,789 A | 1/1997 | Seazholtz et al. |
| 5,479,494 A | 12/1995 | Clitherow | 5,598,464 A | 1/1997 | Hess et al. |
| 5,481,603 A | 1/1996 | Gutierrez et al. | 5,598,487 A | 1/1997 | Hacker |
| 5,483,527 A | 1/1996 | Doshi et al. | 5,602,456 A | 2/1997 | Cargin |
| 5,483,549 A | 1/1996 | Weinberg et al. | 5,602,854 A | 2/1997 | Luse |
| 5,483,586 A | 1/1996 | Sussman | 5,603,085 A | 2/1997 | Shedlo |
| 5,483,587 A | 1/1996 | Hogan et al. | 5,604,682 A | 2/1997 | McLaughlin et al. |
| 5,483,676 A | 1/1996 | Mahany | 5,604,737 A | 2/1997 | Iwami et al. |
| 5,487,111 A | 1/1996 | Slusky | 5,608,446 A | 3/1997 | Carr et al. |
| 5,488,575 A | 1/1996 | Danielson | 5,608,447 A | 3/1997 | Farry et al. |
| 5,490,247 A | 2/1996 | Tung et al. | 5,608,706 A | 3/1997 | Gordon |
| 5,493,568 A | 2/1996 | Sampat et al. | 5,608,786 A | 3/1997 | Gordon |
| 5,493,573 A | 2/1996 | Kobayashi et al. | 5,610,910 A * | 3/1997 | Focsaneanu et al. ........ 370/351 |
| 5,495,521 A | 2/1996 | Rangachar | 5,610,972 A | 3/1997 | Emery et al. |
| 5,500,859 A | 3/1996 | Sharma et al. | 5,610,976 A | 3/1997 | Uota et al. |
| 5,500,889 A | 3/1996 | Baker et al. | 5,610,977 A | 3/1997 | Williams et al. |
| 5,504,746 A | 4/1996 | Meier | 5,615,251 A | 3/1997 | Hogan |
| 5,506,887 A | 4/1996 | Emery et al. | 5,617,343 A | 4/1997 | Danielson |
| 5,506,893 A | 4/1996 | Buscher et al. | 5,617,422 A | 4/1997 | Litzenberger et al. |
| 5,511,111 A | 4/1996 | Serbetcioglu et al. | 5,617,540 A | 4/1997 | Civanlar et al. |

| | | | | | |
|---|---|---|---|---|---|
| 5,619,555 A | 4/1997 | Fenton et al. | 5,724,355 A | 3/1998 | Bruno et al. |
| 5,619,557 A | 4/1997 | Van Berkum | 5,724,406 A | 3/1998 | Juster |
| 5,619,562 A | 4/1997 | Maurer et al. | 5,724,412 A | 3/1998 | Srinivasan |
| 5,621,787 A | 4/1997 | McKoy et al. | 5,726,984 A | 3/1998 | Kubler et al. |
| 5,623,601 A | 4/1997 | Vu | 5,727,002 A | 3/1998 | Miller et al. |
| 5,625,180 A | 4/1997 | Hanson | 5,727,129 A | 3/1998 | Barrett et al. |
| 5,625,404 A | 4/1997 | Grady et al. | 5,729,544 A | 3/1998 | Lev et al. |
| 5,625,407 A | 4/1997 | Biggs et al. | 5,729,599 A | 3/1998 | Plomondon et al. |
| 5,625,555 A | 4/1997 | Davis | 5,732,078 A | 3/1998 | Arango |
| 5,625,675 A | 4/1997 | Katsumaru et al. | 5,732,213 A | 3/1998 | Gessel et al. |
| 5,625,677 A | 4/1997 | Feiertag et al. | 5,737,333 A | 4/1998 | Civanlar et al. |
| 5,625,681 A | 4/1997 | Butler, II | 5,737,395 A | 4/1998 | Irribarren |
| 5,625,682 A | 4/1997 | Gray et al. | 5,737,404 A | 4/1998 | Segal |
| 5,626,682 A | 5/1997 | Kobari et al. | 5,737,414 A | 4/1998 | Walker et al. |
| 5,627,886 A | 5/1997 | Bowman | 5,740,164 A | 4/1998 | Liron |
| 5,633,916 A | 5/1997 | Goldhagen et al. | 5,740,366 A | 4/1998 | Mahany |
| 5,633,919 A | 5/1997 | Hogan | 5,742,596 A | 4/1998 | Baratz et al. |
| 5,636,216 A | 6/1997 | Fox et al. | 5,742,668 A | 4/1998 | Pepe et al. |
| 5,638,430 A | 6/1997 | Hogan | 5,742,670 A | 4/1998 | Bennett |
| 5,640,001 A | 6/1997 | Danielson | 5,742,675 A | 4/1998 | Kilander et al. |
| 5,644,471 A | 7/1997 | Schultz | 5,742,905 A | 4/1998 | Pepe et al. |
| 5,646,982 A | 7/1997 | Hogan et al. | 5,744,533 A | 4/1998 | Iwamoto et al. |
| 5,651,006 A | 7/1997 | Fujino et al. | 5,747,785 A | 5/1998 | Miller |
| 5,652,787 A | 7/1997 | O'Kelly | 5,747,786 A | 5/1998 | Cargin, Jr. |
| 5,654,957 A | 8/1997 | Koyama | 5,748,468 A | 5/1998 | Notenboom et al. |
| 5,657,250 A | 8/1997 | Park et al. | 5,748,619 A | 5/1998 | Meier |
| 5,657,317 A | 8/1997 | Mahany | 5,751,706 A | 5/1998 | Land et al. |
| 5,661,197 A | 8/1997 | Villiger et al. | 5,751,707 A | 5/1998 | Voit et al. |
| 5,661,782 A | 8/1997 | Bartholomew et al. | 5,751,961 A | 5/1998 | Smyk |
| 5,661,790 A | 8/1997 | Hsu | 5,754,639 A | 5/1998 | Flockhart et al. |
| 5,661,792 A | 8/1997 | Akinpelu et al. | 5,754,641 A | 5/1998 | Voit et al. |
| 5,663,208 A | 9/1997 | Martin | 5,757,784 A | 5/1998 | Liebowitz et al. |
| 5,664,005 A | 9/1997 | Emery et al. | 5,758,281 A | 5/1998 | Emery et al. |
| 5,664,102 A | 9/1997 | Faynberg | 5,761,294 A | 6/1998 | Shaffer et al. |
| 5,668,857 A | 9/1997 | McHale | 5,763,867 A | 6/1998 | Main |
| 5,669,062 A | 9/1997 | Olds et al. | 5,764,741 A | 6/1998 | Barak |
| 5,671,436 A | 9/1997 | Morrison | 5,768,513 A | 6/1998 | Kuthyar et al. |
| 5,672,860 A | 9/1997 | Miller | 5,774,530 A | 6/1998 | Montgomery et al. |
| 5,673,031 A | 9/1997 | Meier | 5,774,533 A | 6/1998 | Patel |
| 5,673,263 A | 9/1997 | Basso et al. | 5,774,535 A | 6/1998 | Castro |
| 5,675,507 A | 10/1997 | Bobo, II | 5,774,660 A | 6/1998 | Brendel et al. |
| 5,675,741 A | 10/1997 | Aggarwal et al. | 5,774,695 A | 6/1998 | Autrey et al. |
| 5,679,943 A | 10/1997 | Schultz et al. | 5,778,313 A | 7/1998 | Fougnies |
| 5,680,392 A | 10/1997 | Semaan | 5,781,550 A | 7/1998 | Templin et al. |
| 5,680,442 A | 10/1997 | Bartholomew et al. | 5,781,620 A | 7/1998 | Montgomery et al. |
| 5,680,446 A | 10/1997 | Fleischer et al. | 5,781,624 A | 7/1998 | Mitra et al. |
| 5,680,633 A | 10/1997 | Koenck | 5,784,617 A | 7/1998 | Greenstein et al. |
| 5,682,379 A | 10/1997 | Mahany | 5,787,160 A | 7/1998 | Chaney et al. |
| 5,687,167 A | 11/1997 | Bertin et al. | 5,790,172 A | 8/1998 | Imanaka |
| 5,689,550 A | 11/1997 | Garson et al. | 5,790,536 A | 8/1998 | Mahany |
| 5,689,553 A | 11/1997 | Ahuja et al. | 5,790,548 A | 8/1998 | Sistani zadeh et al. |
| 5,692,039 A | 11/1997 | Brankley et al. | 5,790,806 A | 8/1998 | Koperda |
| 5,694,318 A | 12/1997 | Miller | 5,793,762 A | 8/1998 | Penners et al. |
| 5,694,463 A | 12/1997 | Christie et al. | 5,793,763 A | 8/1998 | Mayes et al. |
| 5,696,903 A | 12/1997 | Mahany | 5,793,771 A | 8/1998 | Darland et al. |
| 5,699,089 A | 12/1997 | Murray | 5,794,043 A | 8/1998 | Kolb |
| 5,699,352 A | 12/1997 | Kriete et al. | 5,796,790 A | 8/1998 | Brunner |
| 5,699,528 A | 12/1997 | Hogan | 5,799,072 A | 8/1998 | Vulcan et al. |
| 5,701,295 A | 12/1997 | Bales et al. | 5,799,156 A | 8/1998 | Hogan |
| 5,701,465 A | 12/1997 | Baugher et al. | 5,802,502 A | 9/1998 | Gell et al. |
| 5,703,935 A | 12/1997 | Raissyan et al. | 5,802,510 A | 9/1998 | Jones |
| 5,703,942 A | 12/1997 | Pinard et al. | 5,802,513 A | 9/1998 | Bowie, III |
| 5,706,286 A | 1/1998 | Reiman et al. | 5,804,805 A | 9/1998 | Koenck |
| 5,708,680 A | 1/1998 | Gollnick | 5,805,474 A | 9/1998 | Danielson |
| 5,708,833 A | 1/1998 | Kinney | 5,805,587 A | 9/1998 | Norris |
| 5,710,728 A | 1/1998 | Danielson | 5,805,682 A | 9/1998 | Voit et al. |
| 5,710,884 A | 1/1998 | Dedrick | 5,805,807 A | 9/1998 | Hanson |
| 5,712,903 A | 1/1998 | Bartholomew et al. | 5,809,128 A | 9/1998 | McMullin |
| 5,712,906 A | 1/1998 | Grady et al. | 5,812,534 A | 9/1998 | Davis et al. |
| 5,712,907 A | 1/1998 | Wegner et al. | 5,812,639 A | 9/1998 | Bartholomew et al. |
| 5,712,908 A | 1/1998 | Brinkman et al. | 5,812,795 A | 9/1998 | Horovitz et al. |
| 5,719,854 A | 2/1998 | Choudhury et al. | 5,812,834 A | 9/1998 | Suzuki |
| 5,722,067 A | 2/1998 | Fougnies | 5,812,865 A | 9/1998 | Theimer et al. |

| | | | | | |
|---|---|---|---|---|---|
| 5,818,836 A | 10/1998 | DuVal | 5,940,598 A | 8/1999 | Strauss et al. |
| 5,818,921 A | 10/1998 | Vander Meiden et al. | 5,940,616 A | 8/1999 | Wang |
| 5,825,780 A | 10/1998 | Christie | 5,940,771 A | 8/1999 | Gollnick |
| 5,825,862 A | 10/1998 | Voit et al. | 5,944,795 A | 8/1999 | Civanlar |
| 5,825,863 A | 10/1998 | Walker | 5,946,299 A | 8/1999 | Blonder |
| 5,825,869 A | 10/1998 | Brooks et al. | 5,946,386 A | 8/1999 | Rogers et al. |
| 5,826,268 A | 10/1998 | Schaefer et al. | 5,949,056 A | 9/1999 | White |
| 5,828,737 A | 10/1998 | Sawyer | 5,949,776 A | 9/1999 | Mahany |
| 5,828,740 A | 10/1998 | Khuc et al. | 5,949,869 A | 9/1999 | Sink |
| 5,828,844 A | 10/1998 | Civanlar et al. | 5,953,322 A | 9/1999 | Kimball |
| 5,832,197 A | 11/1998 | Houji | 5,953,338 A | 9/1999 | Ma et al. |
| 5,834,753 A | 11/1998 | Danielson | 5,953,504 A | 9/1999 | Sokal et al. |
| 5,835,723 A | 11/1998 | Andrews et al. | 5,953,651 A | 9/1999 | Lu et al. |
| 5,838,665 A | 11/1998 | Kahn et al. | 5,956,391 A | 9/1999 | Melen et al. |
| 5,838,682 A | 11/1998 | Dekelbaum et al. | 5,956,482 A | 9/1999 | Agraharam et al. |
| 5,838,686 A | 11/1998 | Ozkan | 5,956,697 A | 9/1999 | Usui |
| 5,838,970 A | 11/1998 | Thomas | 5,958,016 A | 9/1999 | Chang et al. |
| 5,841,764 A | 11/1998 | Roderique et al. | 5,958,052 A | 9/1999 | Bellovin et al. |
| 5,844,893 A | 12/1998 | Gollnick | 5,959,998 A | 9/1999 | Takahashi et al. |
| 5,844,896 A | 12/1998 | Marks et al. | 5,962,837 A | 10/1999 | Main et al. |
| 5,845,267 A | 12/1998 | Ronen | 5,966,431 A | 10/1999 | Reiman et al. |
| 5,848,143 A | 12/1998 | Andrews et al. | 5,966,434 A | 10/1999 | Schafer et al. |
| 5,850,358 A | 12/1998 | Danielson | 5,969,321 A | 10/1999 | Danielson |
| 5,850,433 A | 12/1998 | Rondeau | 5,970,065 A | 10/1999 | Miloslavsky |
| 5,854,833 A | 12/1998 | Hogan | 5,970,477 A | 10/1999 | Roden |
| 5,854,975 A | 12/1998 | Fougnies | 5,974,043 A | 10/1999 | Solomon |
| 5,856,364 A | 1/1999 | Martin | 5,974,052 A | 10/1999 | Johnson et al. |
| 5,862,171 A | 1/1999 | Mahany | 5,978,569 A | 11/1999 | Traeger |
| 5,864,604 A | 1/1999 | Moen et al. | 5,978,840 A | 11/1999 | Nguyen et al. |
| 5,864,610 A | 1/1999 | Ronen | 5,979,768 A | 11/1999 | Koenck |
| 5,867,495 A | 2/1999 | Elliot et al. | 5,982,774 A | 11/1999 | Foladare et al. |
| 5,867,562 A | 2/1999 | Scherer | 5,987,108 A | 11/1999 | Jagadish et al. |
| 5,867,566 A | 2/1999 | Hogan | 5,987,499 A | 11/1999 | Morris |
| 5,870,565 A | 2/1999 | Glitho | 5,991,291 A | 11/1999 | Asai et al. |
| 5,873,099 A | 2/1999 | Hogan | 5,991,292 A | 11/1999 | Focsaneanu et al. |
| 5,878,126 A | 3/1999 | Velamuri et al. | 5,991,301 A | 11/1999 | Christie |
| 5,878,130 A | 3/1999 | Andrews et al. | 5,991,308 A | 11/1999 | Fuhrmann et al. |
| 5,878,212 A | 3/1999 | Civanlar et al. | 5,991,864 A | 11/1999 | Kinney |
| 5,881,134 A | 3/1999 | Foster et al. | 5,995,503 A | 11/1999 | Crawley et al. |
| 5,883,891 A | 3/1999 | Williams et al. | 5,995,606 A | 11/1999 | Civanlar et al. |
| 5,884,032 A | 3/1999 | Bateman et al. | 5,995,608 A | 11/1999 | Civanlar et al. |
| 5,888,087 A | 3/1999 | Hanson | 5,999,524 A | 12/1999 | Corbalis et al. |
| 5,889,774 A | 3/1999 | Mirashrafi et al. | 5,999,525 A | 12/1999 | Krishnaswamy |
| 5,892,754 A | 4/1999 | Kompella et al. | 6,005,926 A | 12/1999 | Mashinsky |
| 5,892,822 A | 4/1999 | Gottlieb et al. | 6,006,100 A | 12/1999 | Koenck |
| 5,892,971 A | 4/1999 | Danielson | 6,006,253 A | 12/1999 | Kumar et al. |
| 5,895,431 A | 4/1999 | Miller | 6,011,975 A | 1/2000 | Emery et al. |
| 5,895,906 A | 4/1999 | Danielson | 6,012,088 A | 1/2000 | Li et al. |
| 5,898,668 A | 4/1999 | Shaffer | 6,014,379 A | 1/2000 | White et al. |
| 5,898,673 A * | 4/1999 | Riggan et al. ............... 370/237 | 6,014,687 A | 1/2000 | Watanabe et al. |
| 5,901,140 A | 5/1999 | Van As et al. | 6,016,307 A | 1/2000 | Kaplan et al. |
| 5,903,558 A | 5/1999 | Jones et al. | 6,016,343 A | 1/2000 | Hogan |
| 5,905,736 A | 5/1999 | Ronen et al. | 6,018,360 A | 1/2000 | Stewart et al. |
| 5,907,547 A | 5/1999 | Foladare et al. | 6,018,567 A | 1/2000 | Dulman |
| 5,910,946 A | 6/1999 | Csapo | 6,021,126 A | 2/2000 | White et al. |
| 5,912,887 A | 6/1999 | Sehgal | 6,021,263 A | 2/2000 | Kujoory et al. |
| 5,914,481 A | 6/1999 | Danielson | 6,023,147 A | 2/2000 | Cargin |
| 5,915,001 A | 6/1999 | Uppaluru | 6,023,474 A | 2/2000 | Christie |
| 5,915,005 A | 6/1999 | He | 6,026,087 A | 2/2000 | Mirashrafi et al. |
| 5,915,008 A | 6/1999 | Dulman | 6,026,091 A | 2/2000 | Christie |
| 5,915,012 A | 6/1999 | Miloslavsky | 6,028,858 A | 2/2000 | Rivers et al. |
| 5,917,175 A | 6/1999 | Miller | 6,029,062 A | 2/2000 | Hanson |
| 5,917,424 A | 6/1999 | Goldman et al. | 6,029,261 A | 2/2000 | Christie |
| 5,918,179 A | 6/1999 | Foladare et al. | 6,031,840 A | 2/2000 | Christie |
| 5,923,659 A | 7/1999 | Curry et al. | 6,035,028 A | 3/2000 | Ward et al. |
| 5,926,482 A | 7/1999 | Christie | 6,036,093 A | 3/2000 | Schultz |
| 5,928,292 A | 7/1999 | Miller | 6,041,109 A | 3/2000 | Cardy et al. |
| 5,930,343 A | 7/1999 | Vasquez | 6,041,117 A | 3/2000 | Androski et al. |
| 5,930,700 A | 7/1999 | Pepper | 6,044,081 A | 3/2000 | Bell et al. |
| 5,933,425 A | 8/1999 | Iwata | 6,046,992 A | 4/2000 | Meier |
| 5,936,958 A | 8/1999 | Soumiya et al. | 6,047,051 A | 4/2000 | Ginzboorg et al. |
| 5,937,045 A | 8/1999 | Yaoya et al. | 6,049,545 A | 4/2000 | Stephenson et al. |
| 5,940,479 A | 8/1999 | Guy et al. | 6,049,813 A | 4/2000 | Danielson |

| | | | | | | |
|---|---|---|---|---|---|---|
| 6,052,450 | A | 4/2000 | Allison et al. | 6,310,941 B1 | 10/2001 | Crutcher et al. |
| 6,058,000 | A | 5/2000 | Koenck | 6,314,103 B1 | 11/2001 | Christie |
| 6,064,653 | A | 5/2000 | Farris | 6,324,264 B1 | 11/2001 | Wiener et al. |
| 6,081,525 | A | 6/2000 | Christie | 6,332,023 B1 | 12/2001 | Porter et al. |
| 6,084,867 | A | 7/2000 | Meier | 6,343,115 B1 | 1/2002 | Foladare et al. |
| 6,084,953 | A | 7/2000 | Bardenheuer et al. | 6,347,084 B1 | 2/2002 | Kelly |
| 6,097,804 | A | 8/2000 | Gilbert et al. | 6,347,085 B2 | 2/2002 | Kelly |
| 6,098,094 | A | 8/2000 | Barnhouse et al. | 6,359,880 B1 | 3/2002 | Curry |
| 6,101,182 | A | 8/2000 | Sistanizadeh et al. | 6,363,065 B1 | 3/2002 | Thornton et al. |
| 6,104,645 | A | 8/2000 | Ong | 6,373,929 B1 | 4/2002 | Johnson et al. |
| 6,104,711 | A | 8/2000 | Voit | 6,374,302 B1 | 4/2002 | Galasso et al. |
| 6,108,341 | A | 8/2000 | Christie | 6,375,344 B1 | 4/2002 | Hanson |
| 6,108,704 | A | 8/2000 | Hutton | 6,381,321 B1 | 4/2002 | Brown et al. |
| 6,112,206 | A | 8/2000 | Morris | 6,385,191 B1 | 5/2002 | Coffman et al. |
| 6,115,458 | A | 9/2000 | Tasket | 6,385,193 B1 | 5/2002 | Civanlar et al. |
| 6,118,936 | A | 9/2000 | Lauer et al. | 6,400,702 B1 | 6/2002 | Meier |
| 6,125,126 | A | 9/2000 | Hallenstal | 6,407,991 B1 | 6/2002 | Meier |
| 6,128,304 | A | 10/2000 | Gardell et al. | 6,430,195 B1 | 8/2002 | Christie |
| 6,131,121 | A | 10/2000 | Mattaway | 6,449,259 B1 | 9/2002 | Allain et al. |
| 6,134,235 | A | 10/2000 | Goldman et al. | 6,449,356 B1 | 9/2002 | Dezonno |
| 6,134,433 | A | 10/2000 | Joong et al. | 6,456,617 B1 | 9/2002 | Oda et al. |
| 6,137,792 | A | 10/2000 | Jonas et al. | 6,480,588 B1 | 11/2002 | Donovan |
| 6,137,869 | A | 10/2000 | Voit et al. | 6,493,353 B2 | 12/2002 | Kelly et al. |
| 6,144,647 | A | 11/2000 | Lopez-Torres | 6,498,788 B1 | 12/2002 | Emilsson et al. |
| 6,144,661 | A | 11/2000 | Katsube et al. | 6,513,066 B1 | 1/2003 | Hutton |
| 6,144,667 | A | 11/2000 | Doshi et al. | 6,529,516 B1 | 3/2003 | Parzych |
| 6,144,976 | A | 11/2000 | Silva | 6,539,015 B2 | 3/2003 | Voit |
| 6,149,062 | A | 11/2000 | Danielson | 6,539,077 B1 | 3/2003 | Ranalli et al. |
| 6,154,445 | A | 11/2000 | Farris et al. | 6,542,497 B1 | 4/2003 | Curry |
| 6,154,777 | A | 11/2000 | Ebrahim | 6,546,003 B1 | 4/2003 | Farris |
| 6,157,621 | A | 12/2000 | Brown et al. | 6,574,216 B1 * | 6/2003 | Farris et al. ................. 370/352 |
| 6,157,823 | A | 12/2000 | Fougnies | 6,574,681 B1 | 6/2003 | White |
| 6,169,735 | B1 | 1/2001 | Alle et al. | 6,584,093 B1 | 6/2003 | Salama et al. |
| 6,175,618 | B1 | 1/2001 | Shah et al. | 6,594,254 B1 | 7/2003 | Kelly |
| 6,181,690 | B1 | 1/2001 | Civanlar | 6,600,733 B2 | 7/2003 | Deng |
| 6,181,703 | B1 | 1/2001 | Christie | 6,600,735 B1 | 7/2003 | Iwama et al. |
| 6,185,184 | B1 | 2/2001 | Mattaway | 6,614,768 B1 | 9/2003 | Mahany |
| 6,185,198 | B1 | 2/2001 | LaDue | 6,614,781 B1 | 9/2003 | Elliott |
| 6,188,677 | B1 | 2/2001 | Oyama et al. | 6,621,942 B1 | 9/2003 | Hacker |
| 6,192,050 | B1 | 2/2001 | Stovall | 6,625,170 B1 | 9/2003 | Curry et al. |
| 6,192,400 | B1 | 2/2001 | Hanson | 6,633,846 B1 | 10/2003 | Bennett et al. |
| 6,198,738 | B1 | 3/2001 | Chang et al. | 6,643,362 B2 | 11/2003 | Hogan |
| 6,201,812 | B1 | 3/2001 | Christie | 6,654,357 B1 | 11/2003 | Wiedeman |
| 6,212,162 | B1 | 4/2001 | Horlin | 6,671,285 B1 | 12/2003 | Kirkby et al. |
| 6,212,193 | B1 | 4/2001 | Christie | 6,678,718 B1 | 1/2004 | Khouri et al. |
| 6,222,919 | B1 | 4/2001 | Hollatz et al. | 6,681,994 B1 | 1/2004 | Koenck |
| 6,226,287 | B1 | 5/2001 | Farris et al. | 6,687,738 B1 | 2/2004 | Hutton |
| 6,226,678 | B1 | 5/2001 | Mattaway | 6,688,523 B1 | 2/2004 | Koenck |
| 6,230,203 | B1 | 5/2001 | Koperda et al. | 6,690,788 B1 | 2/2004 | Bauer et al. |
| 6,233,318 | B1 | 5/2001 | Picard et al. | 6,694,359 B1 | 2/2004 | Morris |
| 6,233,604 | B1 | 5/2001 | Van Horne et al. | 6,701,365 B1 | 3/2004 | Hutton |
| 6,236,851 | B1 | 5/2001 | Fougnies | 6,704,287 B1 | 3/2004 | Moharram |
| 6,240,091 | B1 | 5/2001 | Ginzboorg et al. | 6,711,241 B1 | 3/2004 | White et al. |
| 6,252,869 | B1 | 6/2001 | Silverman | 6,714,559 B1 | 3/2004 | Meier |
| 6,260,067 | B1 | 7/2001 | Barnhouse et al. | 6,714,983 B1 | 3/2004 | Koenck |
| 6,263,372 | B1 | 7/2001 | Hogan | 6,754,181 B1 | 6/2004 | Elliott et al. |
| 6,266,685 | B1 | 7/2001 | Danielson | 6,760,429 B1 | 7/2004 | Hung et al. |
| 6,278,693 | B1 | 8/2001 | Aldred et al. | 6,775,519 B1 | 8/2004 | Wiedeman et al. |
| 6,278,704 | B1 | 8/2001 | Creamer et al. | 6,792,256 B1 | 9/2004 | Kinney |
| 6,279,038 | B1 | 8/2001 | Hogan | 6,810,033 B2 | 10/2004 | Derks |
| 6,282,192 | B1 | 8/2001 | Murphy et al. | 6,823,384 B1 | 11/2004 | Wilson et al. |
| 6,282,281 | B1 | 8/2001 | Low | 6,826,165 B1 | 11/2004 | Meier |
| 6,282,284 | B1 | 8/2001 | Dezonno et al. | 6,829,645 B1 | 12/2004 | Hutton |
| 6,282,574 | B1 | 8/2001 | Voit et al. | 6,839,340 B1 | 1/2005 | Voit et al. |
| 6,285,745 | B1 | 9/2001 | Bartholomew et al. | 6,870,827 B1 * | 3/2005 | Voit et al. .................... 370/352 |
| 6,289,010 | B1 | 9/2001 | Voit et al. | 6,885,678 B2 | 4/2005 | Curry et al. |
| 6,298,057 | B1 | 10/2001 | Guy | 6,895,419 B1 | 5/2005 | Cargin |
| 6,298,062 | B1 | 10/2001 | Gardell et al. | 6,910,632 B2 | 6/2005 | Koerck |
| 6,298,064 | B1 | 10/2001 | Christie | 6,925,054 B1 | 8/2005 | Atterton et al. |
| 6,298,120 | B1 | 10/2001 | Civanlar et al. | 6,990,090 B2 | 1/2006 | Meier |
| 6,301,609 | B1 | 10/2001 | Aravamudan et al. | 7,012,898 B1 | 3/2006 | Farris et al. |
| 6,304,567 | B1 | 10/2001 | Rosenberg | 7,013,001 B1 | 3/2006 | Felger et al. |
| 6,310,873 | B1 | 10/2001 | Rainis et al. | 7,079,534 B1 | 7/2006 | Medhat |

| Patent/Pub No. | Date | Name |
|---|---|---|
| 7,085,362 B1 | 8/2006 | Christie |
| 7,088,705 B2 | 8/2006 | Curry |
| 7,092,379 B1 | 8/2006 | Singh et al. |
| 7,120,319 B2 | 10/2006 | Danielson |
| 7,149,208 B2 | 12/2006 | Mattaway |
| 7,170,887 B2 | 1/2007 | Rosenberg |
| 7,206,592 B1 | 4/2007 | Gollnick |
| 7,236,575 B2 | 6/2007 | Kim et al. |
| 7,274,662 B1 | 9/2007 | Kalmanek et al. |
| 7,286,562 B1 | 10/2007 | Vargo et al. |
| 7,295,830 B2 | 11/2007 | Gilbert et al. |
| 7,359,972 B2 | 4/2008 | Jorgensen |
| 7,492,886 B1 | 2/2009 | Kalmanek |
| 7,502,339 B1 | 3/2009 | Pirkola et al. |
| 2002/0064149 A1 | 5/2002 | Elliott |
| 2002/0067739 A1 | 6/2002 | Wilkes et al. |
| 2002/0083166 A1 | 6/2002 | Dugan et al. |
| 2002/0114324 A1 | 8/2002 | Low et al. |
| 2002/0159461 A1 | 10/2002 | Hamamoto et al. |
| 2003/0078006 A1 | 4/2003 | Mahany |
| 2003/0169767 A1 | 5/2003 | Christie |
| 2003/0112767 A1 | 6/2003 | Meier |
| 2003/0189941 A1 | 10/2003 | Christie |
| 2003/0193933 A1 | 10/2003 | Jones |
| 2003/0198218 A1 | 10/2003 | Farris |
| 2003/0198335 A1 | 10/2003 | Porter et al. |
| 2004/0005046 A1 | 1/2004 | Deo et al. |
| 2004/0018851 A1 | 1/2004 | Koenck |
| 2004/0023651 A1 | 2/2004 | Gollnick |
| 2004/0038717 A1 | 2/2004 | Mahany |
| 2004/0039846 A1 | 2/2004 | Goss et al. |
| 2004/0044667 A1 | 3/2004 | Mahany |
| 2004/0073933 A1 | 4/2004 | Gollnick |
| 2004/0090952 A1 | 5/2004 | Kubler |
| 2004/0093363 A1 | 5/2004 | Cargin |
| 2004/0114567 A1 | 6/2004 | Kubler |
| 2004/0125753 A1 | 7/2004 | Mahany |
| 2004/0131018 A1 | 7/2004 | Johnson et al. |
| 2004/0145775 A1 | 7/2004 | Kubler |
| 2004/0146020 A1 | 7/2004 | Kubler |
| 2004/0146037 A1 | 7/2004 | Kubler |
| 2004/0151150 A1 | 8/2004 | Kubler |
| 2004/0151151 A1 | 8/2004 | Kubler |
| 2004/0151164 A1 | 8/2004 | Kubler |
| 2004/0160912 A1 | 8/2004 | Kubler |
| 2004/0160913 A1 | 8/2004 | Kubler |
| 2004/0162889 A1 | 8/2004 | Morris |
| 2004/0165573 A1 | 8/2004 | Kubler |
| 2004/0165793 A1 | 8/2004 | Hacker |
| 2004/0166895 A1 | 8/2004 | Koenck |
| 2004/0169583 A1 | 9/2004 | Meier |
| 2004/0174841 A1 | 9/2004 | Kubler |
| 2004/0174842 A1 | 9/2004 | Kubler |
| 2004/0174843 A1 | 9/2004 | Kubler |
| 2004/0203834 A1 | 10/2004 | Mahany |
| 2004/0246940 A1 | 12/2004 | Kubler |
| 2004/0264442 A1 | 12/2004 | Kubler |
| 2005/0008002 A1 | 1/2005 | Kubler |
| 2005/0013266 A1 | 1/2005 | Kubler |
| 2005/0021713 A1 | 1/2005 | Dugan et al. |
| 2005/0036467 A1 | 2/2005 | Kubler |
| 2005/0078647 A1 | 4/2005 | Meier |
| 2005/0083872 A1 | 4/2005 | Kubler |
| 2005/0087603 A1 | 4/2005 | Koenck |
| 2005/0191989 A1 | 9/2005 | Plush et al. |
| 2005/0195859 A1 | 9/2005 | Mahany |
| 2005/0232213 A1 | 10/2005 | Meier |
| 2005/0242192 A1 | 11/2005 | Koenck |
| 2005/0254475 A1 | 11/2005 | Kubler |
| 2006/0007951 A1 | 1/2006 | Meier |
| 2006/0062240 A1 | 3/2006 | Meier |
| 2006/0131420 A1 | 6/2006 | Koenck |
| 2006/0233161 A1 | 10/2006 | Koenck |
| 2006/0251226 A1 | 11/2006 | Hogan |
| 2006/0268806 A1 | 11/2006 | Meier |
| 2006/0268807 A1 | 11/2006 | Meier |
| 2006/0274732 A1 | 12/2006 | Allen et al. |
| 2006/0274735 A1 | 12/2006 | Allen et al. |
| 2006/0291752 A1 | 12/2006 | Hacker |
| 2007/0001007 A1 | 1/2007 | Koenck |
| 2007/0007353 A1 | 1/2007 | Danielson |
| 2007/0065046 A1 | 3/2007 | Hacker |
| 2007/0076687 A1 | 4/2007 | Low et al. |
| 2007/0086445 A1 | 4/2007 | Mattaway |
| 2007/0121529 A1 | 5/2007 | Meier |
| 2007/0121591 A1 | 5/2007 | Donovan |
| 2007/0201515 A1 | 8/2007 | Lewis |
| 2007/0206576 A1 | 9/2007 | Radulovic |
| 2007/0263644 A1 | 11/2007 | Christie et al. |
| 2008/0013531 A1 | 1/2008 | Elliott et al. |
| 2008/0063161 A1 | 3/2008 | Joyce et al. |
| 2009/0022147 A1 | 1/2009 | Farris et al. |

FOREIGN PATENT DOCUMENTS

| | | |
|---|---|---|
| EP | 0235057 | 9/1987 |
| EP | 0335562 | 10/1989 |
| EP | 0365885 | 5/1990 |
| EP | 0381365 | 8/1990 |
| EP | 0559979 | 9/1993 |
| EP | 0729281 | 2/1995 |
| EP | 0767568 | 10/1995 |
| EP | 0802690 | 4/1996 |
| EP | 0722237 | 7/1996 |
| EP | 0781016 | 6/1997 |
| EP | 0812089 | 12/1997 |
| EP | 0823809 | 2/1998 |
| JP | 09-168051 | 6/1997 |
| JP | 09-168063 | 6/1997 |
| JP | 09-168064 | 6/1997 |
| JP | 09-168065 | 6/1997 |
| JP | 09-172459 | 6/1997 |
| JP | 09-172462 | 6/1997 |
| WO | 91/07839 | 5/1991 |
| WO | 94/11813 | 5/1994 |
| WO | 95/22221 | 8/1995 |
| WO | 95/29564 | 11/1995 |
| WO | 96/20448 | 7/1996 |
| WO | 96/20553 | 7/1996 |
| WO | 96/32800 | 10/1996 |
| WO | 96/34341 | 10/1996 |
| WO | 96/38018 | 11/1996 |
| WO | 97/14238 | 4/1997 |
| WO | 97/20424 | 6/1997 |
| WO | 97/22211 | 6/1997 |
| WO | 97/23078 | 6/1997 |
| WO | 97/28628 | 8/1997 |
| WO | 97/33412 | 9/1997 |
| WO | 98/12860 | 3/1998 |
| WO | 98/23080 | 5/1998 |
| WO | 98/34391 | 8/1998 |

OTHER PUBLICATIONS

Shah et al., "Application of a New Network Concept for Faster Service Deployment", International Conference on Communications '88, Jne 12-15, 1988, IEEE Communications Society Conference Record, vol. 3, pp. 1327-1329.

Noerpel et al., "PACS: Personal Access Communications System - A Tutorial," IEEE Personal Communications, Jun. 1996.

Varma et al., "Architecture for Interworking Data over PCS," IEEE Communications Magazine, Sep. 1999, 124-130.

Rosenberg et al., "SIP for Presence," 41st IETF, Apr. 3, 1998.

U.S. Provisional U.S. Appl. No. 60/023,891, filed Aug. 16, 1996.

Mills, M. (Mar. 8, 1996) "Freebie Heebie-Jeebies: New Long-Distance Calling Via the Internet Scares Small Phone Firms", The Washington Post, sec. F, pp. 1-2.

Hughes, D.T. (Feb. 21, 1995) "What Hath (Net) God Wrought?", The Journal [Fairfax, Virginia], sec. B, pp. 1-2.

Hughes, D.T. (May 28, 1996) "WebPhone Heading for Serious Telephony", The Journal, [Fairfax, Virginia], sec. A, p. 8.

Mills, M. (Jan. 23, 1996) "It's the Net's Best Thing to Being There: With Right Software, Computer Becomes Toll-Free Telephone", The Washington Post, sec. C, pp. 1,5.

Hughes, D.T. (Jan. 2, 1996) "Internet Phone Wars Heating Up: Companies Improve and Encourage Users to Test Products", The Journal, [Fairfax, Virginia], sec. A, p. 6.

Yang, C. (Feb. 12, 1995), "INETPhone: Telephone Services and Serves on Internet", RFC 1789 http://ds.intemic.net/rfc/rfc/rfc1789.txt.

Kuehn, Richard A. (Jul. 1994) "The Voice of Technology", [Online text only] Credit World, vol. 82, No. 6, pp. 20-23.

Margulies, Edwin (Aug. 1996) Understanding the Voice-Enabled Internet, Flatiron Publishing, Inc., pp. 4-42 and 12-1 to 12-3.

C. Low, "The Internet Telephony Red Herring," Hewlett-Packard Laboratories, (May 15, 1996), pp. 1-15.

C. Low et al., WebIN-an architecture for fast deployment of IN-based personal services, Intelligent Network Workshop, 1996, IN '96, IEEE, (Apr. 21-24, 1996), vol. 2, 196+258.

Cady et al., "Mastering the Internet", Sybex Inc., Alameda, CA 1994, ISBN 94-69309.

Stevens, "TCPIP Illustrated", vol. 1, 1994, Addison-Wesley, pp. 12-122 and inside cover.

Keiser et al., "Digital Telephony and Network Integration", 1995, Chapman Hall, Second Edition, pp. 426-428. cited by examiner.

Chopra, Manvinder, Exploring Intelligent Peripheral Configuration, Universal Personal Communications, 1994. Record., 1994 Third Annual International Conference on, Sep. 27-Oct. 1, 1994, Page(s): 635-639.

Audio Messaging Interchange Specification (AMIS)—Analog Protocol, Version 1, Issue 2, Feb. 1992.

Jabbari, B., "Common Channel Signaling System No. 7 for ISDN and Intelligent Networks", Proceedings of the IEEE, vol. 79, No. 2, Feb. 1991, pp. 155-169.

"Supercharging the Web with Computer Telephony", CT and the 'Net, Mar. 1996.

"Audio and Video Over the Internet", CT and the 'Net, Computer Telephony, Mar. 1996.

Grigonis, Richard, "Computer Telephony Over The Internet", CT and the Net, Mar. 1996.

"Geek of The Week: Carl Malamud Interviews Phil Karn & Jun Murai", Internet Talk Radio, Mobile IP Networking, Nov. 1993.

McConnell, Brian, "How to Build an Internet PBX", Pacific Telephony Design, printed from http://www.phonezone.com/ip-phone.htm Mar. 5, 1997.

"Welcome to the Phone Zone", Pacific Telephony Design, http://www.phonezone.com/index2.htm, pp. 1-6.

Sears, Andrew, "Innovations in Internet Telephony: The Internet as The Competitor to The Pots Network", Innovations in Internet Telephony: The Internet as the Successor to the Pots Network, Feb. 28, 1996, pp. 1-6.

"Computer Telephony And The Internet", Stylus Innovation, http://www.stylus.com/hvml.htm.

Hedrick, C., "Routing Information Protocol", Jun. 1988, http://www.intemic.net/rfc/rfc1058.txt, pp. 1-30.

29 Mills, D.L., "An Experimental Multiple-Path Routing Algorithm", Mar. 1986, http://www.internic.net/rfc/rfc981.txt, pp. 1-20.

Lougheed et al., "A Border Gateway Protocol (BGP)", Jun. 1990, http://www.intemic.net/rfc/rfc1163.txt, pp. 1-26.

S. Deering, "Host Extensions for IP Multicasting", Aug. 1989, http://www.internic.net/rfc/rfc1112.txt, pp. 1-16.

Waitzman et al., "Distance Vector Multicast Routing Protocol", Nov. 1988, http://www.internic.net/rfc/rfc1075.txt, pp. 1-22.

Hinden et al., "The DARPA Internet Gateway", Sep. 1982, http://www.internic.net/rfc/rfc823.txt, pp. 1-41.

"VocalTec's Telephony Gateway - The Ultimate Internet Telephony Solution?," Computer Telephony Magazine, Sep. 1996.

"A Call to Phones," Wired Magazine, Issue 4.03, http://www.wired.com/wired/archive/4.03/updata.html (Mar. 1996).

Mascoli, Cicchetti & Listanti, "Alternative Scenarios for Data Applications Via Internet-Mobile and DECT-ATM Interworkin," 4th IEEE International Conference on Universal Personal Communications, pp. 788-792, Nov. 6-10, 1995 published Apr. 1995.

Blackwell et al. "Secure Short-Cut Routing for Mobile IP," USENIX Summary 1994 Technical Conferences, Jun. 6-10, 1994.

Okada et al. "Mobile Communication Using PHS [Personal Handy Phone System] Communications Server," National Technical Report, vol. 42, No. 1, pp. 46-54 (Feb. 1996).

Sattler, Michael, "Nautilus Voice Encryption," May 10, 1995.

Chernov, Andrey A. "SpeakFreely" software, Apr. 18, 1996.

"Netspeak Corporation Introduces Webphone, Industry's First Internet-Based Telephony Solution for Business Users," PC Forum, Mar. 18, 1996.

"Free World Dialup Beta 2.0a Client," Feb. 12, 1996.

Kahane et al., "VocalTec IP Forum Contribution", VocalTec Inc., Seattle, WA, Jan. 15, 1997.

Handley et al., "SIP: Session Initiation Protocol", Internet Engineering Task Force, Internet Draft, Jul. 31, 1997, draft-ietf-mmusic-sip-03.txt, Jul. 31, 1997.

"Internet Telephony for Dummies" 2nd Edition, Chapters 14-16, 1997.

Kahane et al., "Call Management Agent System Specification" VoIP Forum Technical Committee, Aug. 14, 199.

IMTC Voice over IP Forum Service Interoperability Implementation Agreement, Draft 0.91, Document VoIP-008, Jan. 13, 1997.

Sebestyn, I., ITU Telecommunication Standardization Sector, Study Group 15, Q;2&3/15 Rapporteur Meeting, Document AVC-1086, v1, Dec. 5, 1996.

Oppen et al., "The Clearinghouse: A Decentralized Agent for Locating Named Objects in a Distributed Environment", ACM Transactions on Office Information Systems, vol. 1, No. 3, Jul. 1983, pp. 230-253.

"Overview", NetSpeak Corporation, Apr. 8, 1997, printed from Edgar Online.

"NetSpeak Corporation to Exhibit First Release of Voice Over IP, IP-to-PSTN Networking Products", Business Wire, Jun. 2, 1997.

"Camelot Announces Internet Voice Communication Technology Breakthrough", HighBeamTM Encyclopedia, From: PR Newswire, http://www.encyclopedia.com/doc/1G1-16452259.html?Q=Caml, Feb. 13, 1995, 2 pages.

1979 Annual Technical Report, "A Research Program in Computer Technology", Oct. 1978-Sep. 1979, Prepared for the Defense Advanced Research Projects Agency, University of Southern California, ISI-SR-80-17.

Cohen et al., "A Network Voice Protocol NVP-11", Lincoln Laboratory Massachusetts Institute of Technology, Apr. 1, 1981, ISI/RR-81-90.

1982 Annual Technical Report, "A Research Program in Computer Technology", Jul. 1981-Jun. 1982, University of Southern California, ISI/SR-83-23.

Annual Report to the Defense Communications Agency, "Network Speech Systems Technology Program", Massachusetts Institute of Technology Lincoln Laboratory, Oct. 1, 1980-Sep. 30, 1981, issued Feb. 4, 1982.

Heggestad et al., "Voice and Date Communication Experiments on a Wideband Satellite/Terrestrial Internetwork System", IEEE International Conference on Communications, Integrating Communication for World Progress, Jun. 19-22, 1983.

Annual Report to the Defense Communications Agency, "Defense Switched Network Technology and Experiments Technology", Massachusetts Institute of Technology Lincoln Laboratory, Oct. 1, 1981-Sep. 30, 1982, issued Feb. 5, 1983.

Merritt, "Providing Telephone Line Access to a Packet Voice Network", University of Southern California, Feb. 1983, ISI/RR-83-107.

Weinstein, "The Experimental Integrated Switched Networks- a System Level Network Text Facility", Proceedings of 1983 IEE Military Communications Conference, Washington, DC, Oct. 31, 1983-Nov. 2, 1983.

Cesner et al., "Wideband Communications", 1984 Annual Technical Report, University of Southern California, ISI/ SR-85-150, Jul. 1983-Jun. 1984.

Annual Report to the Defense Communications Agency, "Defense Switched Network Technology and Experiments Technology", Massachusetts Institute of Technology Lincoln Laboratory, Oct. 1, 1982-Sep. 30, 1983, issued Feb. 29, 1984.

Gross; "Proceedings of the Oct. 15-17, 1988 Joint Meeting of the Internet Engineering and Internet Architecture Task Forces", Fourth IETF, The Mitre Corporation.

Corley, "Bellsouth Trial of Wideband Packet Technology", Bellsouth Services, 1990 IEEE, CH2829-0/90/0000-1000.

Inoue et al., "Evolution Scenario of Broadband Services Based on Granulated Broadband Network Concept", IEEE Region 10 Conference, Tencon 92, Nov. 11-th-13th, 1992.

Inoue et al., "Granulated Broadband Network Applicable to B-ISDN and PSTN Services", IEEE Journal on Selected Areas in Communiations, vol. 10, No. 9, Dec. 1992.

Cert et al., "A Protocol for Packet Network Intercommunication", IEEE Transactions on Communications, No. 8, May 1974.

Cole, "Dialing in the WB Network", Information Sciences Institute University of Southern California, Dialing-Cole.83, Apr. 30, 1981.

Hapgood, "Dialing Without Dollars", Jul. 1995, vol. 17, No. 4, pp. 18, Journal Code, INO.

Yang, "INETPhone: Telephone Services and Servers on Internet", Network Working Group, RFC 1798, Apr. 1995, http://ds.intemic.net/rfc1798.txt.

Chen et al., "Integrated Voice/Data Switching", IEEE Communication Magazine, Jun. 1988, vol. 26, No.

Frezza, "The Internet Phone is Poised to Conquer", Communications Week, Dec. 11, 1995, http://techweb.cmp.com/cw/current.

"Internet Access: Internet Phone-to-Phone Technology Now a Reality...", Edge Publishing, Aug. 12, 1996.

"Internet Phone Saves 50% on Long Distance", 411 Newsletter, Aug. 5, 1996, vol. 17, No. 15, United Communications Group.

"Internet Phone Calls are Cheap but Limited", New Media Markets, Feb. 23, 1995, Financial Times Business Information, Ltd., ISSN:0265-4717.

"Internet Telephony Seems to be Evolving East, But is There Anyone on the Line?", Computergram International, Aug. 19, 1996, No. 2980, Issn: 0268-716X.

"Internet's International Phone Calls are Cheap But Limited", Telecom Markets, Financial Times Business Information ID, Mar. 2, 1995, ISSN: 0267-1484.

Mills, The Washington Post, "Phone Service Via the Internet May Slash Rates", Aug. 11, 1996.

Sears, "The Effect of Internet Telephone of the Long Distance Voice Market", Jan. 14, 1995.

National Technical Information Service, Wideband Integrated Voice/Data Technology, ADA132284, Mar. 31, 1983, Massachusetts Inst. of Tech., Lexington, Lincoln Lab.

Detreville et al., "A Distributed Experimental Communications System", Advances in Local Area Networks, IEEE Press, 1987.

Borden et al., "Integration of Real-Time Services in an IP-ATM Network", Internet RFC/STD/FYI/BCP ARchives, Aug. 1995.

Laubach, "Classical IP and ARP over ATM" Hewlett-Packard Laboratories, Jan. 1994, http://www.faqs.org/rfc/rfc1577.txt.

Comer, "Internetworking with TCP/IP", vol. 1, Principles, Protocols, and Architecture, Department of Computer Sciences, 1995.

Perez et al., "ATM Signaling Support for IP Over ATM", Network Working Group, RFC 1765, Feb. 1995, http:/www.ieff.org/rfc/rfc1765.txt.

Stevens, "TCIPIP Illustrated", vol. 1, 1994, Addison-Wesley, pp. 12-122 and inside cover.

Keiser et al., "Digital Telephony and Network Intergration", 1995, Chapman Hall, Second Edition, pp. 426-428. cited by examiner.

Chopra, Manvinder, Exploring Intelligent Peripheral Configuration, Universal Personal Communications, 1994. Record., 1994 Third Annual International Conference on, Sep. 27-Oct. 1, 1994, pp. 635 -639.

Yang, "INETPhone: Telephone Services and Servers on Internet", RFC 1789, Apr, 1995.

Edwin Margulies, "Understanding the Voice Enabled Internet". Aug, 1996, op, 4-42; 12-1-3.

Haley, James E., "Pay-per-call blocking using LIDB," AIN Service Description, Bell Atlantic Easy Number Call Routing Service, Oct. 1996.

American National Standard for Telecommunications - Signalling System No. 7 (SS7) - Signalling Connection Control Part (SCCP), American National Standards Institue, Inc., ANSITI.112-1992, Oct. 26, 1992.

American National Standard for Telecommunications - Signalling System No. 7 (SS7) - Message Transfer Part (MTP), American National Standards Institue, Inc., Mar. 14, 1996.

American National Standard for Telecommunications - Signalling System No. 7 (SS7) - Signalling Connection Control Part (SCCP), American National Standards Institue, Inc., ANSITI.110-1992, Jun. 2, 1992.

Gasman, Lawrence, "Broadband networking," Van Nostrand Reinhold, Jun. 13, 1994.

Balkovich, Ed, et al., "Project clarity: First internal trial," Readiness Review, Bell Atlantic Confidential and proprietary, Jul. 21, 1997.

Grigonis, Richard "Zippy," "Computer telephony over the Internet," CT and the 'Net, Mar. 1996.

Park, Myung Ah, et al., "Dial-up internet access service system with automatic billing mechanism," ICICS 1997, Electronics .and. Telecommunications Research Institute, pp. 148-151, Singapore, Sep. 9-12, 1997.

El-Gendy, Hazem, et al., "Computer-supported routing for intelligent networks and personalized wired communications," ICCS 1994, pp. 1027-1033, Aug. 1994.

"Audio and video over the Internet," CT and the 'Net, Mar. 1996.

Malamud, Carl, et al., "Internet talk radio: Geek of the week," Mobile IP Networking, O'Reilly .and. Associates, Inc., transcript of interview, Nov. 1993.

McConnell, Brian, "How to build an Internet PBX," Pacific Telephony Design, http://www.phonezone.com/ip-phone.htm, pp. 1-9, Oct. 28, 1996.

Sears, Andrew, "Innovations in Internet Telephony: The Internet as the Competitor to the POTS Network," Innovation in Internet Telephony: The Internet as the Successor to the POTS Network, pp. 1-6, Feb. 28, 1996.

"Supercharging the web with computer telephony," CT and the 'Net, Mar. 1996.

Anand, Surinder S., et al., "Accounting architecture for cellular networks," ICPWC '96, IEEE, pp. 184-189, 1996.

Karttunen, Jari, et al., "Cost structure analysis and reference model for SCALEABLE network services," The Institution of Electrical Engineers, pp. 1-9, 1996.

Jennings, Barbara J., "End-User Requirements for High-Integrity Directory," Sandia National Laboratories, Albuquerque, IEEE, pp. 1793-1796, 1996.

Botvich, D., et al., "On Charging for Internet Services provided over an A.TIVI network," IEEE, pp. 669-679, 1997.

Estrin, Deborah, et al., "Design Considerations for Usage Accounting and Feedback In Internetworks," downloaded, Aug. 19, 2008.

Li, Chung-Sheng, et al., "Time-driven Priority" Flow Control for Real-time Heterogeneous Internetworking, IBM T. J. Watson .and. esearch Center, IEEE, p. p. 189-197, 1996.

Edell, RJ., et al., "Billing users and pricing for TCP," IEEE Journal on Selected Areas in Communications, vol. 13, Issue 7, pp. 1162-1175, Sep. 1995.

Margulies, Ed, "CT's Cyberdate With the 'NET," Computer Telephony Periscope, pp. 28-29, Aug. 1996.

Inamori, Hisayoshi, et al., "Common Software Platform for Realizing a Strategy for Introducing the TMC," Network Operations and Management Symposium, vol. 2, pp. 579-589, Feb. 1998.

Rajan, R., et al., "A policy framework for integrated and differentiated services inthe Internet," Network, IEEE, vol. 13, Issue 5, pp. 36-41, Sep./Oct. 1999.

Louth, Nick, "MCI Communications Corp. vaults phone-data divide," Reuters Limited, News article, Jan. 29, 1998.

Eriksson, Hans, "MBONE: The Multicast Backbone," file:IIICl/Documents%20and%20Settings/ralbertJDesktopIMBONE%20The%20Multicast%20Backbone.htm (1 of 13)Mar. 7, 2008 4:06:17 PM.

Macedonia, Michael R., et al., "MBone Provides Audio and Video Across the Internet," file:///C|/Documents%20 /020and%20Settings/ralbert/Deskt...20Audio%20and%20Video%20Across%20the%20Internet.htm (1 of 13) Mar. 10, 2008 9: 34:00 AM.

Lapolla, Stephanie, "Net call centers, voice to merge," News, PC Week, Mar. 31, 1997.

Bohn, Roger, et al., "Mitigating the coming Internet crunch: multiple service levels via precedence," San Diego Supercomputer Center, Mar. 22, 1994.

Weiss, W., "QoS with differentiated services," Bell Labs Technical Journal vol. 3, No. 4, pp. 48-62, Oct.-Dec. 1998.

Hartanto, Felix, et al., "Policy-Based Billing Architecture for Internet Differentiated Services," Proceedings of IFIP Fifth International Conference on Broadband Communications (BC '99), Hong Kong, Nov. 10-12, 1999.

Mahadevan, I., et al., "Parallel Architectures, Algorithms, and Networks," (I-SPAN '99) Proceedings. Fourth InternationalSymposium, pp. 420-425, Jun. 23-25, 1999.

Schulzrinne, H., et al., "A Transport Protocol for Real-Time Applications," Network Working Group, Audio-Video Transport Working Group, pp. 1-151, Mar. 10, 2008.

Schulzrinne, H., "RTP Profile for Audio and Video Conferences with Minimal Control," Network Working Group, Audio-Video Video Transport Working Group, pp. 1-18, Jan. 1996.

Kim, Gary, "Talk is cheap voice over the internet," America's Network, pp. 34-39, Jul. 15, 1996.

Newton, Harry, "Notes from the field: the personal side of CT," 12 Computer Telephony, Jan. 1997.

Venditto, Gus, "Internet phones the future is calling," Internet World Magazine, Jun. 1996.

Crowcroft, Jon, et al., "Pricing internet services," Department of Computer Science, UCL, Gower Street, London, UK, pp. 1-16, downloaded, Aug. 19, 2008.

Newton, Harry, "Telephony Messaging on the Internet," http://www.dialogweb.com/cgi/dwclient? req=1205770063076 (1 of 5) Mar. 17, 2008 12:08:09 PM.

Maruyama, Katsumi, et al., "A Concurrent Object-Oriented Switching Program in Chill," 2460 IEEE Communications Magazine, Jan. 29, 1991, No. 1, pp. 60-68, New York.

Rajkumar, R., et al., "A resource allocation model for QoS management," Proceedings. The 18th IEEE Real-Time Systems Symposium (Cat.No. 97CB36172) p. 298-307, Dec. 2-5, 1997.

Weinrib, A., et al., "Decentralized resource allocation for distributed systems," IEEE INFOCOM '87. The Conference on Computer Communications. Proceedings. Sixth Annual Conference - Global Networks: Concept to Realization (Cat. No. 87CH2412-5) p. 328-36, M.

Shabana, Mohamed, et al., "Intelligent switch architecture," 8081 Proceedings of the National Communications Forum 42 Sep. 30, 1988 No. 2, Chicago, II., pp. 1312-1319.

Nagarajan, Ramesh, et al., "Local Allocation of End-to-End Quality-of-Service in High-Speed Networks," National Research Foundation under grant NCR-9116183 and the Defense Advanced Projects Research Agency under contract NAG2-578, p. p. 1-28, downloaded, A.

Elixmann, Martin, et al., "Open Switching - Extending Control Architectures to Facilitate Applications," ISS Symposium, pp. 239-243, Apr. 23, 1995.

Chandra, P., et al., "Network support for application-oriented QoS," (IWQoS 98) 1998 Sixth International Workshop on Quality of Service, pp. 187-195, May 18-20, 1998.

Klein, Rachelle S., et al., "Minimax Resource Allocation With Tree Structured Substitutable Resources,"Operations Research, vol. 39, No. 2, pp. 285-295, Mar.-Apr. 1991.

Nyong, D., et al., "Resource based policies for design of interworking heterogeneous service networks," Interoperable Communications Networks, vol. 1, Nos. 2-4, pp. 571-580, 1998.

Kabay, S., et al., "The service node-an advanced in services element," 8438 BT Technology Journal vol. 13 Apr. 1995, No. 2, pp. 64-72.

Mayer, Robert L., et al., "Service Net-2000: An intelligent network evolution," 8010 At.and.T Technical Journal 70 (1991) Summer, No. 3/4, pp. 99-110, Short Hills, NJ.

Gupta, Amit, "Resource sharing for multi-party real-time communication," Proceedings of the Fourteenth Annual Joint Conference of the IEEE Computer and Communication Societies (INFOCOM '95), pp. 1230-1237, 1995.

Kausar, Nadia, et al., "A Charging Model for Sessions on the Internet," IEEE, pp. 32-38, Apr. 1999.

Schutzrinne, Henning, "A comprehensive multimedia control architecture for the Internet," IEEE, pp. 65-76, Sep. 1997.

Tsaoussidis, V., et al., "A CORBA-based Application Service Middleware Architecture and Implementation," State University, of NY at Stony Brook, pp. 1-7, downloaded, Aug. 19, 2008.

Bernet, Y., et al., "A Framework for Differentiated Services," The Internet Society, pp. 1-35, Sep. 22, 1999.

Gleeson, B., et al., "A Framework for Ip Based Virtual Private Networks," The Internet Society, pp. 1-62, Feb. 2000.

Yavatkar, Raj, et al., "A Framework for Policy-based Admission Control," Internet Engineering Task Force, pp. 1-19, Apr. 1999.

Ekstein, Ronnie, et al., "AAA Protocols: Comparison between RADIUS, DIAMETER and COPS," Internet Engineering Task Force (IETF), pp. 1-17, Aug. 1999.

Hussmann, H., et al., "An edge device for supporting internet integrated services over switched ATM networks," pp. 1-10, downloaded, Aug. 19, 2008.

Sinnreich, H., et al., "Interdomain IP communications with QoS, authorization and usage reporting," http:www.ietf.org/Internet-drafts. . ., Jan. 2000.

Mascolo, Cecilia, et al., "An XML based Programmable Network Platform," Dept. Of Computer Science, University College London, pp. 1-5, Jun. 10, 2005.

Kumar, Vijay P., et al., "Beyond Best Effort: Router Architectures for the Differentiated Services of Tomorrow's Internet," IEEE Communications Magazine, pp. 152-164, May 1998.

Pan, Ping, et al., "Diameter-SIP," Internet Draft, pp. 1-15, Nov. 15, 1998.

Neilson, Rob, et al., "A Discussion of Bandwidth Broker Requirements for Internet2 Qbone Deployment," Internet2 Qbone BB Advisory Council, Version 0.7, pp. 1-30, Aug. 1999.

Stojsic, Goran, et al., "Formal Definition of SIP Proxy Behavior," IEEE, pp. 289-292, Feb. 2001.

Bhuyan, L, et al., "Impact of switch Design on the Application Performance of Cache-Coherent Multiprocessors," Dept. of Computer Science, Texas A.and.M University and Intel Corp., pp. 1-9, Nov. 15, 2005.

Product Overview, "IP Highway product overview," http://iphighway.com/prod/, pp. 1-4, Sep. 22, 1999.

Rosenberg, Jonathan, et al., "Internet telephony gateway location," IEEE, pp. 488-496, Feb. 1998.

Wright, S., et al., "IP "Telephony" vs. ATM: What is There to Discuss?," IEEE, pp. 400-409, Feb. 1998.

Wedlund, Elin, et al., "Mobility support using SIP," WoWMoM, Jan. 1999.

Aiken, B., et al., "Network Policy and Services: A report of a Workshop on Middleware," Network Working Group, pp. 1-26, Feb. 2000.

Aspnes, James, et al., "On-Line Routing of Virtual Circuits willi Applications to Load Balancing and Machine Scheduling," pp. 486-504, Journal of the ACM, vol. 44, No. 3, May 1997.

Salsano, Stefano, et al., "QoS Control by Means of COPS to Support SIP-Based Applications," IEEE Network, Mar./ Apr. 2007.

White, Paul P., "RSVP and Integrated Services in the Internet: A Tutorial," IEEE Communications Magazine, pp. 100-106, May 1997.

Beck, Christopher J., et al., "Scheduling alternative activities," http://www.aaai.org/home.html, 1999.

Flykt, P., et al., "SIP Services and Interworking IPv6," 3G Mobile Communication Technologies, Mar. 26-28, 2001, Conference Publication No. 477.

Schulzrinne, Henning, et al., "Signaling for internet telephony," Columbia University, Dept. Of Computer Science Technical Report CUCS-005-98, Feb. 2, 1998.

Barzilai, Tsipora, et al., "Design and Implementation of an RSVP-based Quality of Service Architecture for Integrated Services Internet," IEEE, May 1997.

Hubaux, Jean-Pierre, et al., "The impact of the Internet on telecommunication architectures," Computer Networks 31 (1999).

Roberts, Erica, "The New Class System,"http://www.data.com/roundups/class_system.html, pp. 1-14, Sep. 22, 1999.
Wroclawski, J., "The Use of RSVP with IETF Integrated Services," ftp://ftp.isi.edu/in-notes/r1c2210.txt, Sep. 22, 1999.
Sloman, Morris, et al., "Distributed Management for the Networked Millennium," Proceedings of the Sixth IFIP/IEEE International Symposium on Integrated Network Management - Boston, MA, U.S.A., May 24-28, 1999.
Schulzrinne, Henning, "MIME-Version: 1.0," email communication dated Oct. 10, 1995.
Garrahan, James J., et al., "Marching toward the global intelligent network," IEEE Communications Magazine, vol. 31, No. 3, pp. 30-36, Mar. 1993.
Gys, L, et al., "Intelligence in the Network," Alcatel Telecommunications Review, pp. 13-22, 1st Quarter 1998.
Yang, C., "INETPhone Telephone Services and Servers on Internet," Network Working Group, pp. 1-6, Apr. 1995.
Perret, Stephane, et al., "MAP: Mobile Assistant Programming for Large Scale Communication Networks," IEEE, pp. 1128-1132, Apr. 1996.
Plunkett, Bill, "ISCP Service Capacity Improvements," Bellcore, Feb. 29, 1996.
Murray, Dave, "High speed signalling link interface for ISCP version 6.0," Bellcore, Feb. 29, 1996.
Evans, Jeff, "Alternative Approaches for Multi-ISCP Locator," Bell Atlantic, Mar. 13, 1996.
Performance Task Force, "Off-Line Engineering Tool," Bellcore, Sep. 3, 1996.
Jones, Doug R., "Advanced intelligent network delivering control of network routing," Bell Atlantic, downloaded, Aug. 20, 2008.
Gorton, Dave, "ISCP Evolution overview," Telcordia Technologies Inc., Jun. 5, 2001.
Brown, Kathryn C., "Telecom Convergence," PowerPoint presentation, downloaded Aug. 21, 2008.
Cohen, Danny, "Specifications for the Network Voice Protocol (NVP)," http://www.rfc-archive.org/getrfc.php?rfc=741, Nov. 22, 1977.
Low, Colin, "The Internet Telephony Red Herring," Hewlett Packard, pp. 1-15, May 15, 1996.
de la Fuente, La., et al., "Application of the TINA-C Management Architecture," Bellcore, Red Bank, NJ, downloaded, Aug. 21, 2008.
Finseth, C. "An access control protocol, sometimes called TACACS," Network Working Group, University of Minnesota, pp. 1-21, Jul. 1993.
Buchanan, Ken, et al., "IMT-2000: Service Provider's Perspective," IEEE Personal Communications, pp. 8-13, Aug. 1997.
Pontailler, Catherine, "TMN and New Network Architectures," IEEE Communications Magazine, pp. 84-88, Apr. 1993.
Imielinski, Tomasz, et al., "Mobile Wireless Computing: Solutions and Challenges in Data Management," Department of Computer Science, Rutgers University, downloaded, Oct. 22, 2008.
Balmer, R., et al., "A Concept for RSVP Over DiffServ," Institute of Computer Science and Applied Mathematics, University of Berne, Switzerland, http://www.iam.unibe.ch/-rvs, pp. 412-417, IEEE, May 2000.
Ziegler, Jr., K., "A Distributed Information System Study," IBM Syst J, vol. 18, No. 3, pp. 374-401, 1979.
Blake, S., et al., "An Architecture for Differentiated Services," Network Working Group, pp. 1-36, Dec. 1998.
Walters, Rob, "Computer Telephony Integration," Second Edition, Artech House, 1999.
IMTC Voice over IP Forum Service Interoperability Implementation Agreement, Draft 0.91, IMTC Voice over IP Forum Technical Committee, VoIP97-008, Jan. 13, 1997.
Braden, R., et al., "Integrated Services in the Internet Architecture: an Overview," Network Working Group, pp. 1-28, Jul. 1994.
Braun, Torsten, "Internet Protocols for Multimedia Communications," Part II: Resource Reservation, Transport, and Application Protocols, IEEE MultiMedia, pp. 74-82, Oct.-Dec. 1997.
Black, Uyless D., "Internet Telephony Call Processing Protocols," Prentice Hall Ptr, www.phptr.com, 2001.
Briere, Daniel D., et al., "Internet Telephony for Dummies," 2nd Edition, IDG Books Worlwide, Inc., 1997.
Vin, Harrick M., et al., "Multimedia Conferencing in the Etherphone Environment," Xerox Palo Alto Research Center, IEEE, pp. 69-79, Oct. 1991.
Detti, Andrea, et al., "Supporting RSVP in a Differentiated Service Domain: an Architectural Framework and a Scalability Analysis," http://www-st.influ-dresden.de/elisa/, downloaded, Oct. 27, 2008.
Bernet, Yoram, "The Complementary Roles of RSVP and Differentiated Services in the Full-Service QoS Network," QoS Mechanisms, Microsoft, downloaded, Oct. 27, 2008.
Herzog, S., et al., "COPS Usage for RSVP," Network Working Group, pp. 1-15, Jan. 2000.
Sebestyen, Istvan, "What is the position of Q.2, 0.3/15 on Internet Telephony for the IMTC - VoIP Forum Meeting in Seattle," ITU Telecommunication Standardization Sector, Study Group 15, pp. 1-5, Dec. 5, 1996.
Daniele, M., et al., "Textual Conventions for Internet Network Addresses," Nework Working Group, pp. 1-16, Jun. 2000.
Handley, M., et al., "SIP: Session Initiation Protocol," Internet Engineering Task Force, pp. 1-30, Dec. 2, 1996.
Weinstein, Clifford J., "The Experimental Integrated Switched Network - a System-Level Network Test Facility," IEEE, pp. 449-456, Jan. 1983.
"Computer Telephony and the Internet," pp. 1-8, downloaded, Jul. 14, 2009.
Jitian, Xiao, et al., "Sharing Model of Netware Node Resources and Real-Time Scheduling," Mini-Micro Systems, vol. 16, No. 12, pp. 54-59, Dec. 1995.
Zellweger, Polle T., et al., "An overview of the etherphone system and its applications," Xerox Palo Alto Research Center, pp. 160-168, Apr. 1988.
Ng, L.J., et al., "Distributed architectures and databases for intelligent personal communication networks," Department of Electrical Engineering, U. Of British Columbia, pp. 300-304, Feb. 1992.
Malyan, Andrew D., et al., "Network architecture and signaling for wireless Personal communications," IEEE Journal on Selected Areas in Communications, vol. 11, No. 6, pp. 830-841, Aug. 1993.
Malyan, Andrew D., et al. "A Microcellular Interconnection Architecture for Personal Communications Networks," Department of Electrical Engineering, University of British Columbia Vancouver, B.C., V6T 1W.5, Canada, pp. 502-505, Feb. 1992.
Bakre, Ajay, et al., "M-RPC: A Remote Procedure Call Service for Mobile Clients," Department of Computer Science Rutgers, The State University of New Jersey Piscataway, NJ, pp. 97-110, 1995.
O'Malley, Sean W., "A Dynamic Network Architecture," Department of Computer Science, University of Arizona, ACM Transactions on computer systems, vol. 10, No. 2, pp. 110-143, May 1992.
Cheshire, Stuart, et al., "Internet Mobility 4 by 4," SIGCOMM 96 - Stanford, California, USA, pp. 1-2, Aug. 1996.
Chang, Rong N., et al., "A Service Acquisition Mechanism for the Client/Service Model in Cygnus," IBM Canada Laboratory Technical Report TR 74.059, pp. 323-345.
Arao, Shinya, et al., "Component-based policy deployment for service level differentiation in converging communication networks," IEEE, pp. 1388-1392, 1999.
Goyal, Pawan, et al., "Integration of call signaling and resource management for IP telephony," IEEE Network, pp. 24-32, May/Jun. 1999.
Delatore, J.P., et al., "The 5ESS switching system: Fatory system testing," AT+T Technical Journal, vol. 64, No. 6, Jul.-Aug. 1985.
Oran, Dave, "Dial plan mapping for voice-over-IP," Access Engineering, Apr. 11, 1996.
Getting started guide for Internet Phone release 4, http://www.vocaltec.com, 1993-1996 VocalTec Inc.
VocalTec desktop dialer version 3.0, User reference, http://www.vocaltec.com, 1997 VocalTec Ltd.
"Vocaltec's telephony gateway software captures 1996 product of the year honors from computer telephony magazine," Herzliya, Israel, Dec. 18, 1996, VocalTec, Ltd.
"Introduction to VTG," Northvale, NJ 07647, Tel. 201-768-9400, info@vocaltec.com.
Kahane, Opher, et al., "IMTC VoIP Forum Contribution." Subject: Call management agent system requirements function architecture and protocol, VoIP97-010, pp. 1-44, Seattle, Jan. 1, 1997.

Kahane, Opher, "Introduction to VocalTec's CMA system," Intelligent switching for a new era of telecom, Nov. 7, 1996.
Newton, Harry, "Newton's Telecom Dictionary," 22nd edition, pp. 728, 2006.
Braden, R., et al., "Resource ReSerVation Protocol (RSVP) - Version 1 Functional Specification," Network Working Group, pp. 1-224, Univ. of Michigan, Sep. 1997.
Keiser, Bernhard E., et al., "Digital Telephony and Network Integration," downloaded Jul. 1, 2008.
Boyle, Jim, et al., "The COPS (Common Open Policy Service) Protocol," http://www.ietf.orgiintemet-drafts/draft-ietf-rap-cops-07.txt, pp. 1-35, Aug. 16, 1999.
Bellamy, John, "Digital telephony," Dallas, TX, Oct. 1981.
Open and standardized - the world of IP Protocols, "H.323: The Leading Standard in Voice over IP," downloaded Jul. 1, 2008.
"Inside APPN - The Essential Guide to the Next-Generation SNA," IBM, International Technical Support Organization Raleigh Center, Raleigh, NC, Jun. 1997.
Friedes, A., et al. "Integrating the world through communications," IEEE ICC, vol. 1 of 3, Jun. 22-25, 1986.
Huitema, Christian, "Routing in the internet," Prentice Hall, Englewood Cliffs, NJ, 1995.
Lucky, R.W., "Applications of communications theory," Fundamentals of digital switching, AT+T Laboratories, Second Edition, downloaded, Jul. 3, 2008.
Bellamy, John, "Digital telephony," Second Edition, Wiley Series in Telecommunications, downloaded, Jul. 3, 2008.
Stallings, William, "ISDN and Broadband ISDN with frame relay and ATM," Prentice Hall, Upper Saddle River, NJ, downloaded, Jul. 3, 2008.
GR-1298-CORE, AINGR: Switching Systems, Telcordia Technologies, Issue 10, Nov. 2004.
GR-2863-CORE, CCS Network Interface Specification (CCSNIS) Supporting Advanced Intelligent Network (AIN), Bellcore, Bell Communications Research, Issue 2, Dec. 1995.
GR-246-CORE, Telcordia technologies specification of signalling system No. 7, Telcordia Technologies, Issue 10, Dec. 2005.
GR-1280-Core, Advanced intelligent network (AIN) service control point (SCP) generic requirements, Telcordia Technologies, Issue 1, Aug. 1993.
Morris, Christopher, Academic Press Dictionary of Science and Technology, Academic Press, downloaded, Jul. 3, 2008.
GR-1428-Core, CCS Network Interface Specification (CCSNIS) Supporting Toll-Free Service, Bellcore, Issue 2, May 1995.
Mockapetris, P., "Domain names - concepts and facilities," Network working group, Nov. 1987.
Mockapetris, P., "Domain names - implementation and specification," Network Working Group, Nov. 1987.
Finseth, C. "An access control protocol, sometimes called TACACS," Network Working Group, University of Minnesota, pp. 1-20, Jul. 1993.
Carrel, D., "The TACTACS+ Protocol," Network Working Group, Cisco, Oct. 1996.
ITU-T, "Line transmission of non-telephone signals," Recommendation H.323, May 28, 1996.
Product releases webpage, VocalTec, info@vocaltec.com, Aug. 26, 1996.
Tutorial on "H.323," by the International Engineering Consortium, http://www.iec.org, pp. 1-30, downloaded, Jul. 3, 2008.
Everhart, C., et al., "New DNS RR Definitions," Network Working Group, University of Maryland, pp. 1-11, Oct. 1990.
Handley, M., et al., "SIP: Session Initiation Protocol," Network Working Group, The Internet Society, Mar. 1999.
Rosenberg, J., et al., "SIP: Session Initiation Protocol," Network Working Group, The Internet Society, Jun. 2002.
Brannen, Lynn, et al., "Next generation switch," MCI Telecommunications, May 16, 1997.
Shen, Yi-Shang, "Communications network with flexible call routing and resource allocation," MCI Invention Disclosure Form, Jan. 8, 1998.
Kahane, Opher, et al, "Call management agent system specification," VoIP Forum Technical Committee Contribution, Chicago, II, Aug. 14, 1996.

Pulver, Jeff, "The Internet telephone tookit," Wiley Computer Publishing, New York, NY, 1996.
Mills, Mike, "Phone service via the Internet may slash rates," The Washington Post, A Section; p. A01, Sunday, Final Edition, Aug. 11, 1996.
Chapman, Martin, et al, "Overall Concepts and Principles of TINA," TINA-C, Version 1.0, Feb. 17, 1995.
Kahane, Opher, et al, "Call Management Agent System Specification," Voice over IP Forum Technical Committee in Chicago, Aug. 14, 1996.
Verjinski, Richard D., "Phase, A Portable Host Access System Environment," IEEE, May 1989.
*Verizon Services Corp., et al., v. Cox Fibernet Virginia, Inc., et al.*, Report of Herman J. Helgert, Ph.D., Exhibit D, downloaded, Aug. 21, 2008.
*Verizon Services Corp., et al., v. Cox Fibernet Virginia, Inc., et al.*, Report of Herman J. Helgert, Ph.D., Exhibit E, downloaded, Aug. 21, 2008.
*Verizon Services Corp., et al., v. Cox Fibernet Virginia, Inc., et al.*, Report of Herman J. Helgert, Ph.D., Exhibit F, downloaded, Aug. 21, 2008.
The Jeff Pulver Blog: Free World Dialup and Verizon's patent on "name translation," http://pulverblog.pulver.com/archives/006846.html, pp. 1-19, Apr. 23, 2007.
Lipoff, Stuart, "Operations Support System Framework for Data Over Cable Services," Data Over Cable Technical Reports, MCNS Holdings, L.P., Oct. 16, 1996.
Sinnreich, H., et al., "Interdomain IP communications with QoS, authorization and usage reporting," http:www.cs.columbia.edu/-hgs/sip/drafts/draft-sinnreich-sip-qos-osp, Feb. 2000.
Pan, Ping, et al., "Diameter: Policy and Accounting Extension for SIP," Internet Engineering Task Force, Internet Draft, pp. 1-17, Nov. 15, 1998.
Schulzrinne, Henning, et al., "Interaction of Call Setup and Resource Reservation Protocols in Internet Telephony," pp. 1-13, Jun. 11, 1999, downloaded, Aug. 21, 2008.
Rosen, E., et al., "Memo re: BGP/MPLS VPNs," Networking Group, pp. 1-25, Mar. 1999.
Waksberg, M., "Axe 10 and the Intelligent Network," Commutation .and. Transmission, No. 4, pp. 67-76, Dec. 1993.
Niitsu, Yoshihiro, et al., "Computer-aided stepwise service creation environment for intelligent network," NTT Communication Switching Laboratories, Tokyo, Japan, IEEE, pp. 454-458, 1992.
Morgan, Michael J., et al., "Service creation technologies for the intelligent network," At.and.t Technical Journal, Summer 1991.
Fujioka, Masanobu, et al., "Universal service creation and provision environment for intelligent network," XIII International Switching Symposium, Stockholm, Sweden, Proceedings vol. III, pp. 149-156, May 27 - Jun. 1, 1990.
Moy, J., "OSPF Version 2," Network Working Group, Proteon, Inc., Jul. 1991.
Lantz, Keith A., "Towards a universal directory service," Operating Systems Review, vol. 20, No. 2, Apr. 1986.
Fang, Wenjia, "Building an Accounting Infrastructure for the Internet," Princeton University, IEEE, pp. 105-109, 1996.
Aidarous, Salah, et al., "The role of the element management layer in network management," 1994 IEEE Network Operations and Management Symposium, Feb. 14-17, 1994.
Gareiss, Robin, "Voice over the internet," Data Communications, pp. 93-100, Sep. 1996.
Bethoney, Herb, "HAHTSite Gives Pros Everything They Need," PC Week, p. 36, Mar. 10, 1997.
Kolarov, Aleksandar, et al., "End-to-end Adaptive Rate Based Congestion Control Scheme for ABR Service in Wide Area ATM Networks," IEEE International Conference on Communications, Seattle, Washington, pp. 138-143, Feb. 1995.
Chen, Larry T., et al., "ATM and Satellite Distribution of Multimedia Educational Courseware," 1996 IEEE International Conference on Communications, pp. 1133-1137, Jun. 23-27, 1996.
Civanlar, M. Reha, et al., "FusionNet: Joining the Internet .and. Phone Networks for Multimedia Applications," ACM Multimedia 96, pp. 431-432, 1996.

Cobbold, Christopher, et al., "Enhancement for Integrated Wireless Personal Communications over Metropolitan Area Networks," 1996 IEEE International Conference on Communications, pp. 1370-1376, Jun. 23-27, 1996.

Comer, Douglas E., "Internetworking With TCP/IP," 3rd ed., V. 1. Principles, protocols, and architecture, Prentice-Hall, Inc., 1995.

Mahadevan, I., et al., "Quality of service achitectures for wireless networks: IntSery andDiffServ models," http://ieeexplore.ieee.org/xpllabsprintf.jsp?arnumber==778974.and.page. . ., Aug. 6, 2002.

Ahmadi, H., et al., "NBBS Traffic management overview," IBM Systems Journal, vol. 34, No. 4, pp. 604-628, 1995.

Stoica, Ion, et al., "LIRA: An Approach for Service Differentiation in the internet," sponsored by DARPA under contract Nos. N66001-96-C-8528 and NOOI74-96-K-0002, and by a NSF Career Award under grant No. NCR-9624979. Additional support was provided.

Duan, Juan, et al., "Efficient Utilization of Multiple Channels between two Switches in ATM Networks," IEEE, pp. 1906-1911, 1995.

Ejiri, Masayoshi, et al., "For Whom the Advancing service/network management," IEEE, pp. 422-433, 1994.

Lee, Whay Chiou, et al., "Integrated Packet Networks With Quality of Service Constraints," Globecom, IEEE, pp. 8A.3.1-8A.3.5, 1991.

Elia, Carlo, et al., "Skyplex: Distributed Up-link for Digital Television via Satellite," IEEE Intelligent Network workshop in, Melbourne, Australia, Apr. 21-24, 1996.

Ely, Tom, "The Service Control Point as a Cross Network Integrator," Bellcore, IEEE, pp. 1-8, 1996.

Mamais, G., et al., "Efficient buffer management and scheduling in a combined IntServand DiffServ architecture: a performance study," ATM, 1999. ICATM '99. 1999 2nd International Conference on, pp. 236-242, Jun. 21-23, 1999.

Baumgartner, F., et al., "Differentiated services: a new approach for quality of service in the Internet," Proceedings of Eighth International Conference on High Performance Networking, pp. 255-273, Sep. 21-25, 1998.

Sibal, Sandeep, et al., "Controlling Alternate Routing in General-Mesh Packet Flow Networks," SIGCOMM 1994, London, England, pp. 168-179, Aug. 1994.

Jajszczyk, A., et al., "Bringing information to People," IEEE INFOCOM '95, Proceedings, vol. 3, Apr. 2-6, 1995.

CT and the 'Net, "Webphone," Computer Telephony pp. 219-221, Mar. 1996.

Sisalem, Dorgham, et al., "The Network Video Terminal," IEEE Proceedings of HPDC-5, pp. 3-10, 1996.

Baumgartner, H., et al., "Middleware for a New Generation of Mobile Networks: The ACTS OnTheMove Project," http:// www.isoc.org/inet96/proceedings/a6/a6_3.htm, pp. 1-4, Apr. 14, 2008.

"Talk Talk," telecom, pp. 68-72, Jun. 1996.

Kreller, Birgit, et al., "UMTS: A Middleware Architecture and Mobile API Approach," IEEE Personal Communications, pp. 32-38, Apr. 1998.

Low, Colin, et al., "WebIN - An Architecture for Fast Deployment of IN-based Personal Services," IEEE, 1996.

Grami, A., et al., "The Role of Satellites in the Information Superhighway," IEEE International Conference on Communications, pp. 1577-1581, Jun. 18-22, 1995.

Gupta, Ranabir, et al., "Technical Assessment of (T)INA - TMN - OSI Technology for Service Management Applications," IEEE Network Operations and Management Symposium, vol. 3, pp. 877-887, Feb. 14-17, 1994.

Inamori, Hisayoshi, et al., "Applying TMN to a Distributed Communications Node System with Common Platform Software," NTT Network Service Systems Laboratories, Tokyo, Japan, pp. 83-87, IEEE International Conference on Communications, Seattle, WA.

Clark, David D., et al., "Supporting Real-Time Application in an Integrated Services Packet Network: Architecture and Mechanism," COMM'92, MD, USA, pp. 14-26, Aug. 1992.

Peeren, Rene, "IN in the Hybrid Broadband Network the Intelligent Web," Presentation, Ericsson, IEEE 1996.

Jain, Surinder K., "Evolving Existing Narrowband Networks Towards Broadband Networks with IN Capabilities," Bellcore Intelligent Networks, IEEE, Apr. 22, 1996.

Matta, Ibrahim, et al, "Type-of-Service Routing in Dynamic Datagram Networks," Department of Computer Science, University of Maryland, pp. 992-999, IEEE 1994.

Yeager, Nancy J., et al., "Web Server Technology: The Advanced Guide for World Wide Web Information Providers," National Center for Supercomputing Applications, pp. 250, Morgan Kaufman Publishers, Inc., 1996.

Kishimoto, Ryozo, "Agent Communication System for Multimedia Communication Services," IEEE INFOCOM, Fifteenth Annual Joint Conference of the IEEE Computer and Communications Societies, pp. 10-17, Mar. 24-28, 1996.

Willebeek-LeMair, Marc H., "Videoconferencing over Packet-Based Networks," IEEE Journal on Selected Areas in Communications, vol. 15. No. 6, pp. 1101-1114, Aug. 1997.

Kumar, Vinay, "Internet Multicasting: Internet's Next Big Thing," ICAST Corporation, pp. 1-13, Sep. 23, 1997.

The Wall Street Journal article on: "MCI's New Service for Corporate Use Sets 1 Line for Net, Phone," pp. B16, Jan. 30, 1997.

Sharp, C.D., et al., "Advanced Intelligent Networks-now a reality," Electronics .and. Communication Engineering Journal, pp. 153-162, Jun. 1994.

Pezzutti, David A., "Operations Issues for Advanced Intelligent Networks," IEEE Communications Magazine, pp. 58-63, Feb. 1992.

Oppen, Derek C., et al., "The Clearinghouse: A Decentralized Agent for Locating Named Objects in a Distributed Environment," ACM Transactions on Office Information Systems, vol. 1, No. 3, Jul. 1983, pp. 230-253.

Rendleman, John, et al., "ATM Goes Into Orbit. . .While IP Gets Speedy in Space," Communications Week, Mar. 17, 1997, www.commweek.com.

Miller, Mark A., "Troubleshooting TCP/IP: Analyzing the Protocols of the Internet," M.and.T Books, pp. 365-389, 1992.

Platt, Richard, "Why IsoEthernet Will Change the Voice and Video Worlds," IEEE Communications Magazine, pp. 55-59, Apr. 1996.

Quicklook, "Internet by Stellite," 1 page, http://www.netsatx.net.

Rosalyn, Retkwa, "Telephone Politics," Internet World, Jun. 1996.

Schreyer, Oliver, et al., "Least Cost Call Routing - A Brilliant Application for Private IN," IEEE International Conference on Communications, vol. 2 of 3, Jun. 23-27, 1996.

Rodriguez Serrano, Inma, "Evolution of a Hybrid Fibre Coaxial Network for Multimedia Interactive Services," British Telecommunications Egineering, vol. 15, pp. 249-253, Oct. 1996.

Sunaga, Hiroshi, et al., "A Reliable Communication Switching Platform for Quick Service Provisioning," IEEE International Conference on Communications, Seattle, WA, Jun. 18-22, 1995.

Marketing materials re: Workshops on "Telephony on the Internet," to take place on Sep. 24-25, 1996, at The Drake Hotel, Chicago, Illinois.

Gralla, Preston, "How the Internet Works," Ziff-Davis Press, pp. 118-119, 1996.

Gralla, Preston, "How the Internet Works," Ziff-Davis Press, pp. 64-67, 1996.

Tsuchida, Hisazumi, et al., "Intelligent Dynamic Service Provisioning Architecture in the Multimedia Era," NTT Information and Communication Systems Laboratories, IEEE, pp. 1117-1122, 1996.

Low, Colin, "Integrating Communication Services," IEEE Communications Magazine, pp. 164-169, Jun. 1997.

Fridisch, M., et al., "Terminals for Accessing the Internet - The Internet Telephone," Alcatel Telecommunications Review, 4th Quarter, pp. 304-309, 1996.

Hurwicz, Michael, "Switched ATM is fast, but not that smart. Routed IP is smart, but not that fast. Why not combine them?," http://www.ipsilon.com/, Apr. 1997.

Diehl, Standford, "Data's New Voice," BYTE, Special Report, pp. 129-135, Sep. 1996.

Kahn, Jeffery, "Videoconferencing Debuts on the Internet," LBL, U.S. Department of Energy, Berkeley, California, University of California, Feb. 28, 1995.

Braun, Hans-Werner, et al., "A framework for flow-based accounting on the Internet," National Science Foundation (NCR-9119473), downloaded, Aug. 21, 2008.

Kelly, Katy, "Up to their laptops in packed powder: Mountaintop office keeps skiers in touch," USA Today, Final Edition, News, pp. 1A, Feb. 21, 1997.

Braun, Torsten, "Implementation of an Internet Video Conferencing Application over ATM," IBM European Networking Center, Heidelberg, Germany, IEEE, pp. 287-294, 1997.

Sclavos, Jean, et al., "Information Model: From Abstraction to Application," Telecom Paris, France, pp. 1-13, downloaded, Aug. 21, 2008.

Black, Uyless D., "OSI: A model for computer communications standards," Prentice-Hall, Inc., pp. 157-201, 1991.

Sriram, Kotikalapudi, et al., "Voice Packetization and Compression in Broadband ATM Networks," IEEE Journal on Selected Areas in Communications, vol. 9, No. 3, pp. 294-304, Apr. 1991.

Arango, Mauricio, et al., "Guaranteed Internet Bandwith," IEEE, pp. 862-866, Nov. 18, 1996.

Lapolla, Stephanie, "Seagate joins the backup vendors' enterprise forays," PC Week, The National Newspaper of Corporate Computing, vol. 13, No. 33, Aug. 19, 1996.

Harmer, Julie, et al., "Revised Requirements for Mobile-API-Interim deliverable," OnTheMove public project, pp. 1-44, Dec. 1996.

Schulzrinne, Henning, "Personal Mobility for Multimedia Services in the Internet," IDMS '96 (European Workshop on Interactive Distributed Multimedia Systems and Services), Berlin, Germany, pp. 1-18, Mar. 4-6, 1996.

Schulzrinne, "Simple Conference Invitation Protocol," Internet Engineering Task Force, pp. 1-19, Feb. 22, 1996.

Ash, G.R., et al., "Design and Optimization of Networks With Dynamic Routing," American Telephone and Telegraph Company, The Bell System Technical Journal, vol. 60, No. 8, pp. 1787-1820, Oct. 1981.

Prosecution history of U.S. Patent No. 6,332,023, Issued, Dec. 18, 2001.

The Phone Zone, an online reference cite and catalog of PC based telephony and networking solution for business, http://www.phonezone.com/index2.htm, Oct. 29, 1996.

"IDT's Net2Phone Launches Phone-to-Phone Technology Via The Internet," Press release, http://web.net2phone.com/ about/press/releases/p2p.asp, Sep. 8, 1997.

"Vocaltec's telephony gateway - the ultimate internet telephony solution?," Computer Telephony, pp. 30, Sep. 1996.

Cheriton, David R., "Dissemination-Oriented Communication Systems: Final Report," ARPA contract No. DABT63-91-K-0001, Nov. 26, 1996.

Johnson, David B., "Scalable Support for Transparent Mobile Host Internetworking," Proceedings of the Ninth Annual IEEE Worshop on Computer Communications, pp. 1-10, Oct. 1994.

"Specifications of Signalling System No. 7," International Telecommunication Union, ITU-T Telecommunication Standardization Sector of ITU, Recommendation, Q.700, Mar. 1993.

"Integrated Services Digital Network (ISDN) 1.312," CCITT The International Telegraph and Telephone Consultative Committee, ITU International Telecommunication Union, Recommendation, 1.312/Q.1201, Oct. 1992.

"Interface Recommendation for Intelligent Network CS-1," International Telecommunication Union, ITU-T Telecommunication Standardization Sector of ITU, ITU-T Recommendation Q.1218, Oct. 1995.

"Series Q: Switching and Signalling," Intelligent Network, International Telecommunication Union, ITU-T, Telecommunication Standardization Sector of ITU, Recommendation Q.1218 - Addendum 1, Sep. 1997.

Swinehart, D.C. et al., "Adding Voice to an Office Computer Network", IEEE GLOBECOM '83 Conference Record, vol. 1, Nov. 28, 1983, p. 392-398.

* cited by examiner

PACKET DATA NETWORK VOICE CALL QUALITY MONITORING

RELATED APPLICATIONS

This application is a continuation of U.S. patent application Ser. No. 08/815,361 filed on Mar. 11, 1997 now U.S. Pat. No. 6,574,216. This application is related to application Ser. No. 08/821,027, filed Mar. 19, 1997 and entitled Voice Call Alternative Routing Through PSTN And Internet Networks, application Ser. No. 08/634,544, entitled Universal Access Multimedia Network, filed Apr. 18, 1996, application Ser. No. 08/634,543, entitled Internet Telephone Service, filed Apr. 18, 1996 and application Ser. No. 08/670,908, entitled Internet Telephone System, filed Jun. 28, 1996. The specifications of those applications are incorporated herein by reference in their entirety.

TECHNICAL FIELD

The present invention relates to telecommunications networks and more particularly to monitoring the quality of performance of voice calls routed through a data packet network. If quality conditions are determined to be unacceptable, call routing is transferred through a voice telephone network without requiring termination of the call.

BACKGROUND OF THE INVENTION

Implementation of voice telephone service over a worldwide data network, such as the Internet, offers advantages that are now being explored. The Internet had its genesis in U.S. Government (called ARPA—Advanced Research Projects Agency) funded research which made possible national internetworked communication systems. This work resulted in the development of network standards as well as a set of conventions and protocols for interconnecting networks and routing information. These protocols, commonly referred to as TCP/IP—Transport Control Protocol/Internet Protocol—have subsequently become widely used in the industry. TCP/IP is flexible and robust. In effect, TCP takes care of the integrity and IP moves the data. Internet provides two broad types of services: connectionless packet delivery service and reliable stream transport service. The Internet basically comprises several large computer networks joined together over high-speed data links ranging from ISDN to T1, T3, FDDI, SONET, SMDS, TO1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries.

A simplified diagram of the Internet is depicted in FIG. 1. The Internet 50 comprises Autonomous Systems (AS) which may be owned and operated by Internet Service Providers (ISPs) such as PSI, UUNET, MCI, SPRINT, etc. Three such AS/ISPs are shown in FIG. 1 at 52, 54 and 56. The Autonomous Systems (ASs) are linked by Inter-AS Connections 58, 60 and 62. Information Providers (IPs) 64 and 66, such as America Online (AOL) and Compuserve, are connected to the Internet via high speed lines 68 and 70, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, Sprint is an ISP, and MicroSoft (MSN) is an IP using UUNET as an ISP. Other information providers, such as universities, are indicated in exemplary fashion at 72 and are connected to the AS/ISPs via the same type connections, here illustrated as T1 lines 74. Corporate Local Area Networks (LANs), such as those illustrated at 76 and 78, are connected through routers 80 and 82 and links shown as T1 lines 84 and 86. Laptop or PC computers 88 and 90 are representative of computers connected to the Internet via the public switched telephone network (PSTN), shown connected to the AS/ISPs via dial up links 92 and 96.

The Information Providers (IPs) are end systems that collect and market the information through their own servers. Access providers are companies such as UUNET, PSI, MCI and SPRINT which transport the information. Such companies market the usage of their networks.

In simplified fashion the Internet may be viewed as a series of gateway routers connected together with computers connected to the routers. In the addressing scheme of the Internet an address comprises four numbers separated by dots. An example would be 164.109.211.237. Each machine on the Internet has a unique number that includes one of these four numbers. In the address, the leftmost number is the highest number. By analogy this would correspond to the ZIP code in a mailing address. The first two numbers that constitute this portion of the address may indicate a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This process continues until the packet arrives at the destination computer. The separate packets that constitute a message may not travel the same path, depending on traffic load. However, they all reach the same destination and are assembled in their original sequence order in a connectionless fashion. This is in contrast to connection oriented modes such as frame relay and ATM or voice.

Software has recently been developed for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers. The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

Palmer et al., U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al., U.S. Pat. No. 5,341,374, issued Aug. 23, 1994 for Communication Network Integrating Voice Data and Video with Distributed Call Processing, discloses a local area network with distributed call processing for voice, data and video. Real-time voice packets are transmitted over the network, for example to and from a PBX or central office.

Hemmady et al., U.S. Pat. No. 4,958,341, issued Sep. 18, 1990 for Integrated Packetized Voice and Data Switching System, discloses an integrated packetized voice and data switching system for a metropolitan area network (MAN). Voice signals are converted into packets and transmitted on the network.

Tung et al., U.S. Pat. Nos. 5,434,913, issued Jul. 18, 1995, and 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al., U.S. Pat. No. 4,872,160, issued Oct. 3, 1989, for Integrated Packetized Voice and Data Switching System, discloses an integrated packetized voice and data switching system for metropolitan area networks.

Sampat et al., U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al., U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the internet protocol (IP).

The commonly assigned applications, Ser. Nos. 08/634,543 and 08/670,908, identified more particularly above, are concerned with providing telephone service via the Internet to users of the public telecommunications network who may not have access to a computer or separate telephone access-to the Internet. Such service would be economical, especially for long distance calls, compared with the toll rates charged by long distance interexchange carriers.

With increasing volume of use on the Internet and the bursty nature of data transmission, traffic patterns have become unstable and unpredictable. The minimum quality of service acceptable for voice communication is much higher than the level for data transport as transmission delays noticeably degrade conversation. With the Internet or other high volume data network, acceptable voice communication may be available between two end points at a given time, but often not at other times. A surge in data traffic may make the network unsuitable for voice communication for as much as twenty or thirty minutes. Bottlenecks may occur at different points in the network at different times. The locations of the participants of a voice call are factors in determining suitability of the data network. The degree to which degradation of a voice call remains acceptable is subjective with the user and can be a tradeoff between quality of service and reduction of cost.

A deficiency in earlier proposed voice Internet service systems is the inability to ensure an acceptable level of service quality. Voice communication by nature should be perceived as real time interaction in order to be acceptable to the parties of the call. The packet data network traffic in the connection paths of a voice call may render intolerable transmission delays. Current systems do not measure delays against user acceptable standards. A high level of congestion and delay in a data network often leads to lost or dropped data packets that would noticeably degrade reconstructed voice audio. The voice call user must either endure such deficiencies or terminate the call in favor of originating a new call through an alternative system.

The aforementioned commonly assigned application Ser. No. 08/821,097 filed Mar. 19, 1997 and entitled Voice Call Alternative Routing Through PSTN And Internet Networks, is concerned with determining routing of voice calls alternatively between the public switched telephone network (PSTN) and a data packet network, such as the Internet, in accordance with the quality of service existing in the data packet network at the times of call origination. Through use of the PSTN Advanced Intelligent Network (AIN), a caller may predefine an acceptable level of service, for example 2.4 or 4.8 kbs to be stored in the user's Call Processing Record (CPR) in the AIN Integrated Services Control Point (ISCP). On a per call basis, the caller linked to a first public switched network may indicate a preference to route through the Internet. This indication would be recognized by the AIN system, in response to which the quality of service currently present on the Internet for completion of the call is measured. If the result exceeds the stored threshold, the call is set up and routed through the Internet to the switched network link to the destination party. If the quality of service on the Internet is not satisfactory, the call would be alternatively routed through the PSTN, which may include an Interexchange Carrier link.

The last described arrangement is an improvement over prior voice data network schemes in the respect that determination of data network performance quality avoids set up of a call that would be known at the outset to be inadequate for voice communication. However, with relatively unstable and unpredictable traffic patterns in data networks such as the Internet, the alternative set up arrangement does not accommodate a change to poor data network performance conditions after a call has been placed and routed through the data network. Thus, parties to such a call still must either suffer the deficiencies in voice quality, perhaps in the hope that data traffic conditions improve, or terminate the call in favor of a new call manually placed through the switched telephone network.

BRIEF SUMMARY OF THE INVENTION

The present invention overcomes the above noted drawbacks of earlier proposed systems and provides additional advantages in part by monitoring the quality of service existing in a data packet network during the course of communication of a voice call through the data network. The user's acceptable level of service may be predefined with a threshold quality level stored in the user's Call Processing Record (CPR) in the AIN Integrated Services Control Point (ISCP) If the monitored quality is maintained in excess of the stored threshold, communication of the call continues through the established course of transmission. If the measured quality of service on the data network is not satisfactory, the routing of the call is changed to communication solely through a voice telephone network connection, which may include an Interexchange Carrier link, without terminating the call. Thus, the packet data network is bypassed to obtain voice grade quality while maintaining the call.

Monitoring of the data network, which may be the Internet, may be under control of a module that interfaces between the data network and the public switched telephone network. The caller's predefined acceptable level of quality, stored in the AIN ISCP may be obtained by the module for comparison with monitored levels. Upon failure of the comparison, the module can issue a signal to the calling station switch to automatically establish a connection for the call from the calling station switch through the PSTN to a second switch coupled to the called station. Such signal also can be generated by the module in response to a DTMF input by either user. Such input reflects the user's perceived dissatisfaction with quality of the call and acts as a command to automatically reroute the call to bypass the data network. Upon connection of the two switches through the voice telephone network, the voice call is bridged at each of the switches to the established connection. Communication of the call through the packet data network path is thereafter terminated.

Additional advantages of the present invention will become readily apparent to those skilled in this art from the following detailed description, wherein only the preferred embodiment of the invention is shown and described, simply by way of illustration of the test mode contemplated for carrying out the invention. As will be realized, the invention is capable of other and different embodiments, and its several details are capable of modifications in various obvious respects, all without departing from the invention. Accordingly, the drawings, throughout the various figures of which like elements are depicted by the same reference numerals, and description are to be regarded as illustrative in nature, and not as restrictive.

DETAILED DESCRIPTION OF THE INVENTION

Figure 2:
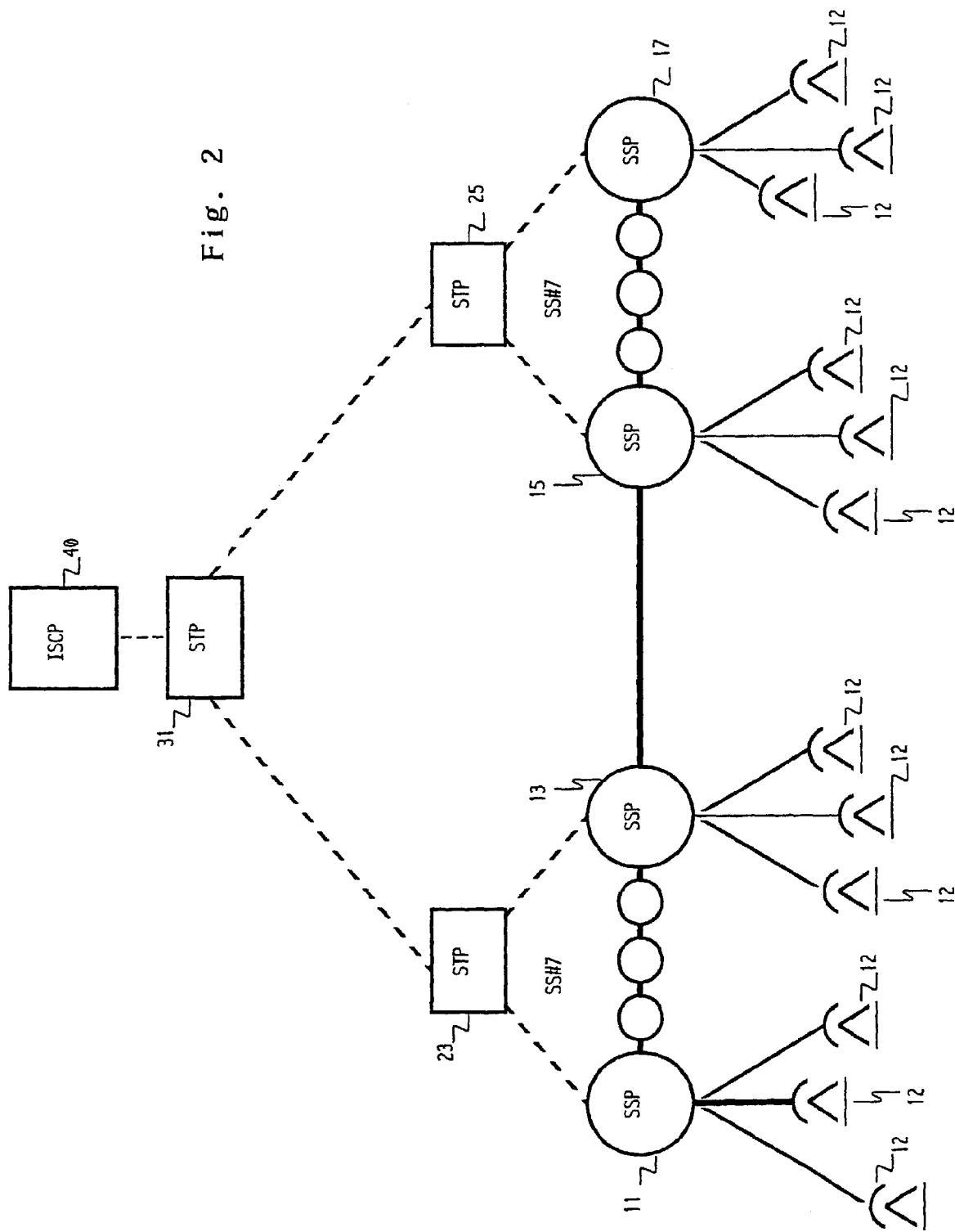
FIG. 2 is a simplified block diagram of a Public Switched Telephone Network (PSTN) that comprises a Common Channel Interoffice Signaling (CCIS) system and voice communication network that perform as an Advanced Intelligent Network (AIN) system.

FIG. 2 is a depiction of the AIN architectural environment that is considerably simplified for explanation purposes. The full network and operating environment for the invention may comprise multiple central offices, diverse interconnections, and provisions for reliability through redundancy, all of which need not be shown for developing an understanding of the invention. Service Switching Points (SSPs) 11, 13, 15, 17 represent central office (CO) switching systems that are appropriately equipped programmable switches present in the telephone network. Subscriber lines individually connect SSPs to subscriber premises at which locations telephones 12 or other communication devices are connected. As well known, the SSPs recognize AIN type calls, launch queries to the ISCP and receive commands and data from the ISCP to further process the AIN calls. In the illustrated embodiment, the CO-SSPs are end offices.

SSP capable central office switching systems typically contain a programmable digital switch with CCIS communications capabilities. One example of an SSP capable CO switch is a SESS type switch manufactured by AT&T. Other vendors, such as Northern Telecom and Seimens, manufacture comparable digital switches that may serve as the SSPs. A more detailed description of an exemplary SSP type CO is presented in the commonly assigned copending application, Ser. No. 08/248,980, filed May 25, 1994, hereby incorporated by reference herein.

The SSP type COs 11 and 13 are shown connected to a first local area STP 23, SSP-COs 15 and 17 being connected to a second local area STP 25. The connections to the STPs are for signaling purposes. The control part of SS7 protocol is known as Integrated Services Digital Network User Part (ISUP). ISUP determines the procedures for setting up, coordinating, and taking down trunk calls on the SS7 network.

Signaling between switching offices is required for transmitting routing and destination information, for transmitting alerting messages such as to indicate the arrival of an incoming call, and for transmitting supervisor information, e.g. relating to line status. Signaling between offices can use 'in-band' transport or 'out-of-band' transport.

In-band signaling utilizes the same channel that carries the communications of the parties. In a voice telephone system, for example, one of the common forms of in-band signaling between offices utilizes multi-frequency signaling over voice trunk circuits. The same voice trunk circuits also carry the actual voice traffic between switching offices. In-band signaling, however, tends to be relatively slow and ties up full voice channels during the signaling operations. In telephone call processing, a substantial percentage of all calls go unanswered because the destination station is busy. For in-band signaling, the trunk to the end office switching system serving the destination is set-up and maintained for the duration of signaling until that office informs the originating office of the busy line condition. Thus, in-band signaling greatly increases congestion on the voice traffic channels. In-band signaling also is highly susceptible to fraud by hackers who have developed devices that mimic in-band signaling.

Out-of-band signaling has evolved to mitigate the above-described problems. Out-of-band signaling utilizes separate channels, and in many cases separate switching elements. Congestion on the channels carrying the actual communication traffic is thereby considerably reduced. Unauthorized simulation of signaling messages which ride on an out-of-band channel or network is virtually impossible. As out-of-band signaling utilizes its own signal formats and protocols, unconstrained by protocols and formats used for the actual communication, out-of-band signaling typically is considerably faster than in-band signaling.

Out of-band-signaling networks typically include data links and one or more packet switching systems. Out-of-band signaling for telephone networks is often referred to as Common-Channel Signaling (CCS) or Common Channel Interoffice Signaling (CCIS). Most such signaling communications for telephone networks utilize signaling system 7 (SS7) protocol. An SS7 compliant CCIS network, such as illustrated in FIG. 2, comprises data Signal Transfer Points (STPs) and data links between the STPs and various telephone switching offices of the network. The STPs are program controlled packet data switching systems. In normal call processing operation, an STP will receive a packet data message from another node of the network, for example from an end office switching system. The STP analyzes point code information in the packet and routes the packet according to a translation table stored within the STP. This translation table is static.

Any packet having a particular point code is output on a port going to the next CCIS signaling node specified by translation of that point code.

Each local area STP can connect to a large number of the SSP-COs, as indicated for ease of illustration merely by the circles below STPs 23 and 25. The central office SSPs are interconnected to each other by trunk circuits for carrying telephone services. The overall network may contain end offices without SSP functionality. Such end offices will forward calls to one of the SSPs if such treatment is required. Also, certain switching offices within the network, whether SSPs or not, may function primarily as tandem type offices providing connections between trunk circuits only.

The local area STPs 23 and 25, and any number of other such local area STPs (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSPs or not, may function primarily as tandem type offices providing connections between trunk circuits only.

The links between the central office switching systems and the local area STPs 23 and 25 are typically SS#7 type CCIS interoffice data communication channels. The local area STPs are in turn connected to each other and to the regional STP 31 via a packet switched network. The regional STP 31 also communicates with the ISCP 40 via a packet switched network.

Messages transmitted between the SSPs and the ISCP are formatted in accord with the Transaction Capabilities Applications Protocol (TCAP). The TCAP protocol provides standardized formats for various query and response messages. Each query and response includes data fields, for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node. Reference is made to the aforementioned copending application, Ser. No. 08/248,980, filed May 25, 1994, for a more detailed description of the AIN network.

The ISCP 40 is an integrated system that contains a data base. In the AIN network system, certain calls receive specialized AIN type processing under control of data files stored in the ISCP data base. Such files contain call processing-records (CPRs) associated with respective AIN subscribers. Information-contained in the CPRs relate to the AIN service or services to which the customer subscribes. The SSP type local offices of the public telephone network include appropriate data in their translation tables for customers subscribing to AIN services to define certain call processing events identified as AIN "triggers". The SSP uses the translation table data to detect a triggering event during processing of calls to or from such AIN service subscribers. Upon detection of such event, the SSP suspends processing of a call and activates a query and response type AIN interaction with the ISCP. Completion of call processing ensues after sufficient information is exchanged between the SSP and the ISCP. For ordinary telephone service calls that are not subject to enhanced treatment, there would be no event to trigger AIN messaging. The local and toll office switches would function normally and process such calls without referring to the ISCP data base for instructions.

Figure 3:
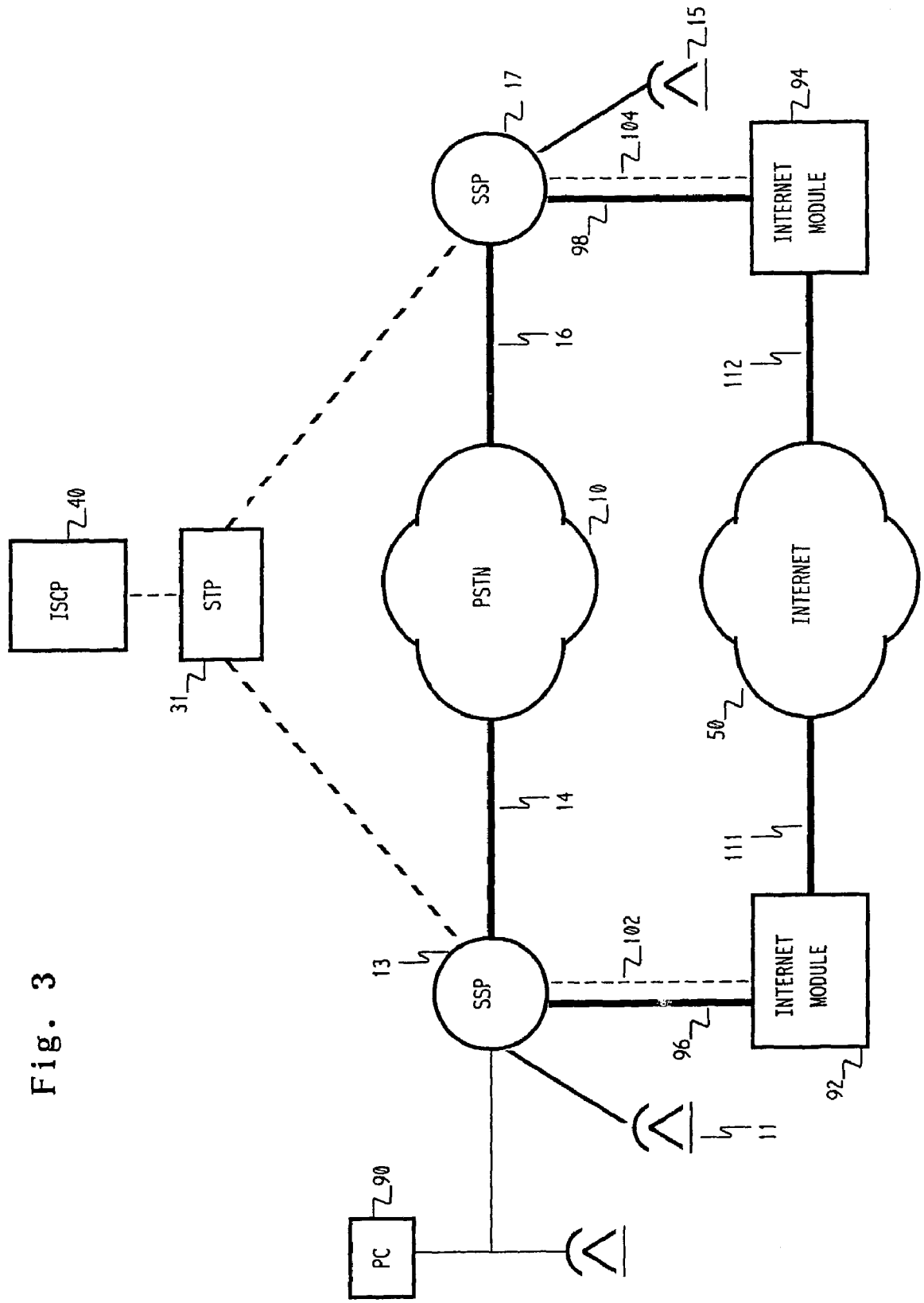
FIG. 3 is a simplified block diagram of an AIN controlled PSTN, such as the type shown in FIG. 2, which includes architecture for implementing Internet routing in accordance with one preferred embodiment of the invention.

FIG. 3 is a simplified block diagram of an AIN controlled PSTN, such as the type shown in FIG. 2, which includes architecture for implementing Internet routing in accordance with one preferred embodiment of the invention. It is to be understood that the Internet representation in this figure, as well as throughout this disclosure, is illustrative of any packet network of routers that allows voice traffic to be packetized and sent over a shared network. The use of the phrases "Internet" and "data packet network" or the like are used interchangeably throughout this description. SSP capable central offices 13 and 17, which may be located in the same or different states and regions, are connected by trunks 14 and 16 respectively to the PSTN indicated by a cloud 10. Each central office is connected by local loops to subscribers customer premises equipment (CPE) such as telephone terminals 12 and PC 90. The telephone 12 may be a standard telephone used for Plain Old Telephone Service (POTS), with conversion of analog voice to digital signals performed at a central office, or a so-called "Internet Phone" that outputs digital voice signals. The SSPs 13 and 17 are connected by CCIS links to STP 31 which in turn may be connected to ISCP 40. While the STP functionality is here shown as constituting a single STP it will be appreciated that this is for the purpose of simplicity only and that a hierarchy of STPs may be involved.

Each of the central office SSPs 13 and 17 is connected to Internet Module 92 and 94, respectively, by T1 trunks 96 and 98. Alternatively, the Internet Module hardware may be situated at the central office and associated with the switching system. The Internet Module will be described in further detail with respect to FIG. 4. The Internet Modules may be provided with SSP capabilities and connected into the CCIS network directly to an STP or, as illustrated by the links 102 and 104, to the SSPs 13 and 17. The Internet Modules may be linked together for signaling purposes by conventional F links. The Internet Modules are connected to the Internet cloud by T1/T3 trunks 111 and 112.

Figure 1:
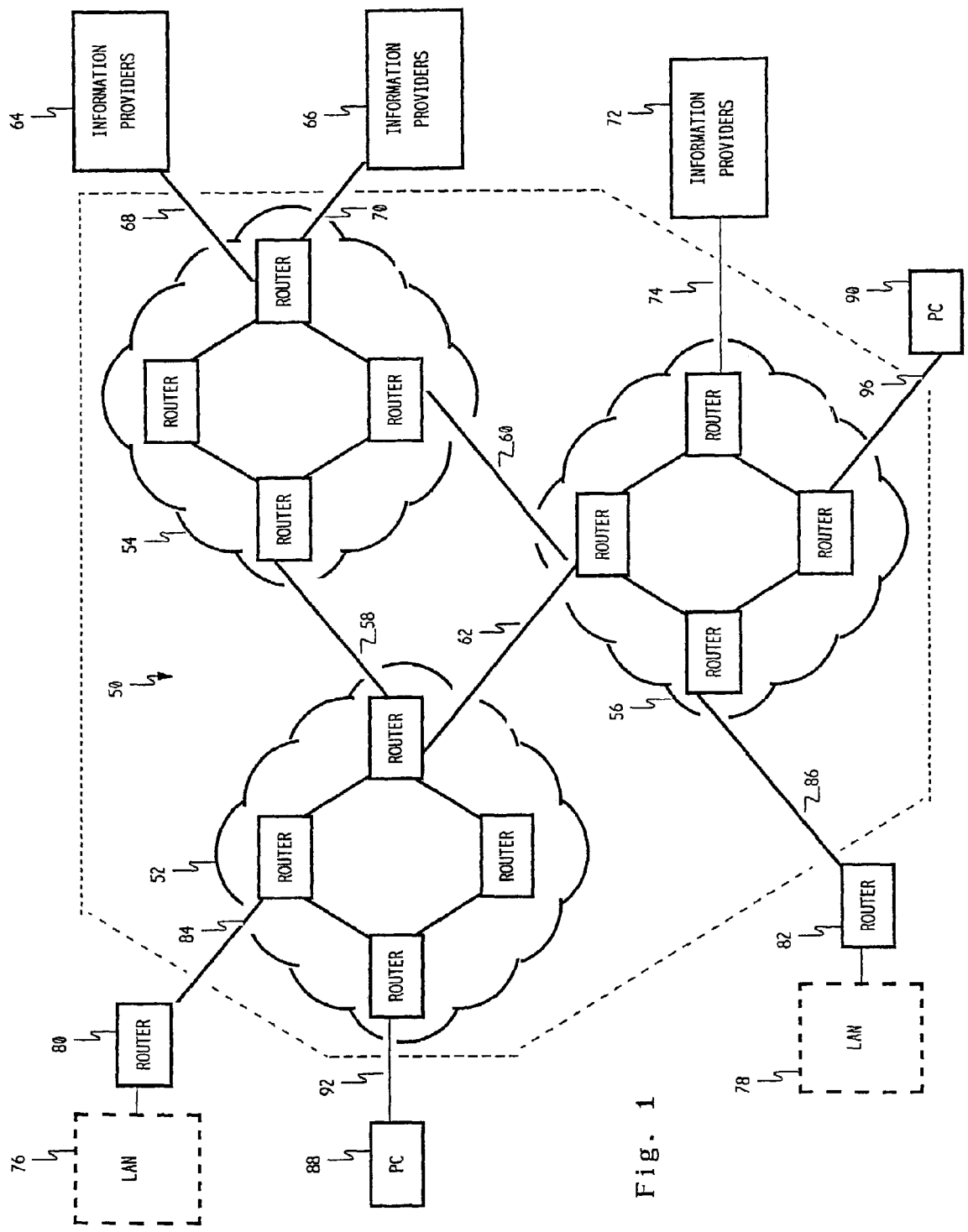
FIG. 1 is a simplified diagram of the Internet.
Figure 4:
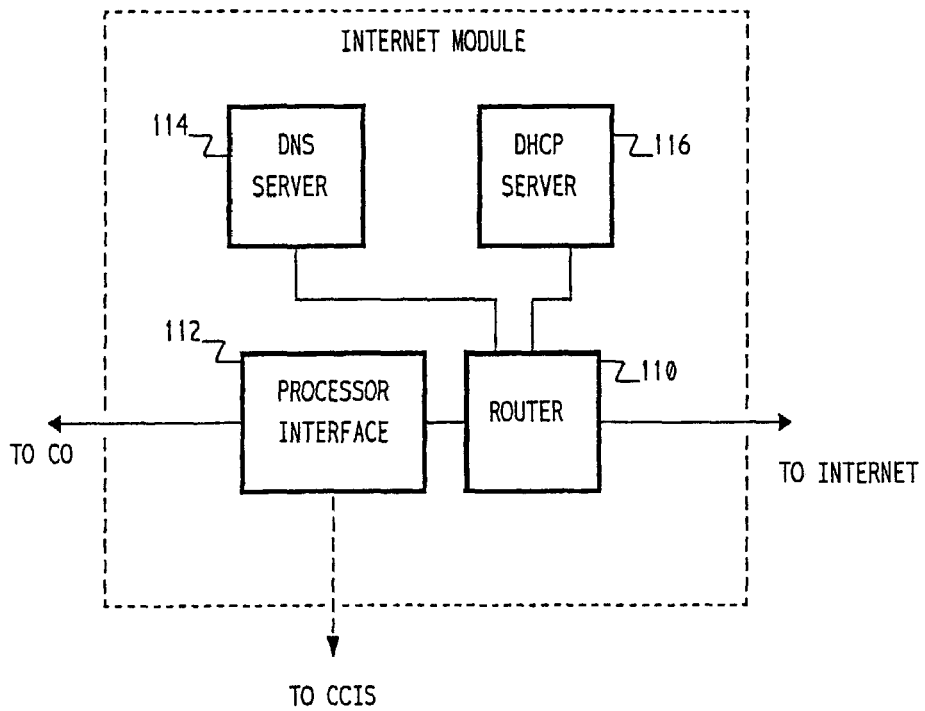
FIG. 4 is a diagram of the functional architecture of one embodiment of an Internet Module for use in the system and method of the invention.

The functional architecture of one embodiment of an Internet Module for use in the invention is shown diagrammatically in FIG. 4. The Internet Module includes a gateway router 110 of the type now generally used in Internet practice, such as shown in FIG. 1 and described in related application Ser. No. 08/634,544, referenced above. An interface with processing capability is illustratively shown at 112. Connected to the router are a Domain Name Service (DNS) server 114 and a Dynamic Host Configuration Protocol (DHCP) server 116 of the type conventionally used by Internet Service Providers in existing Internet Service. The router interface is connected to the central office and to the CCIS network while the router is connected to the Internet.

Figure 5:
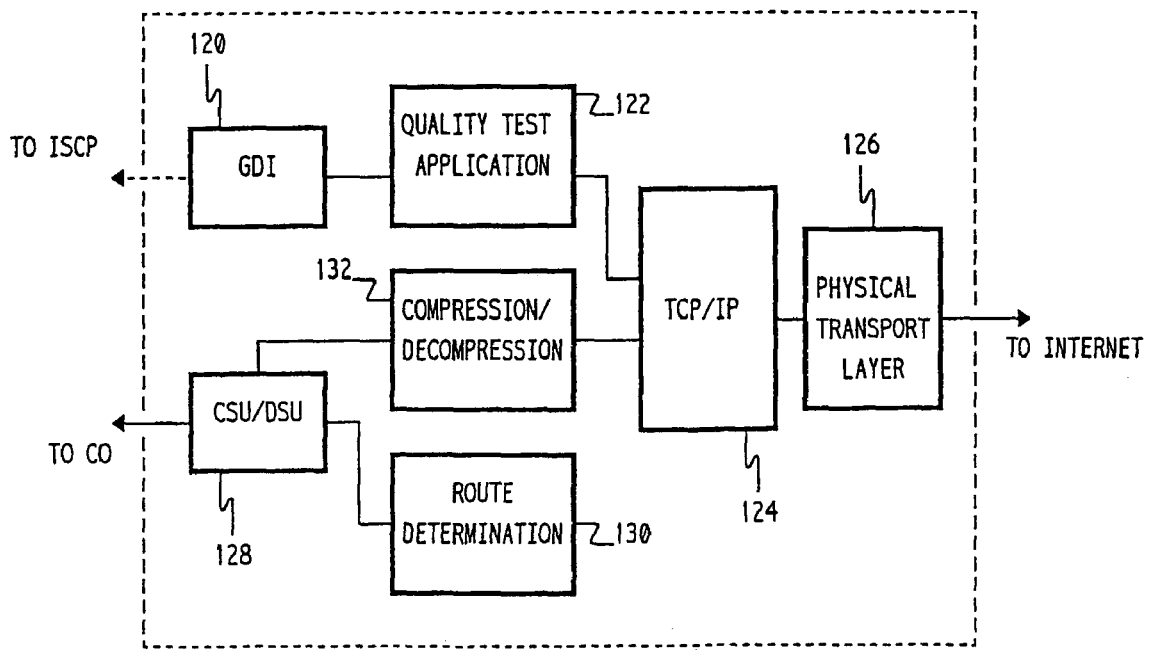
FIG. 5 is a block diagram that represents the functionality of the processor interface 112 and the router 110 shown in FIG. 4.

FIG. 5 is a block diagram that represents the functionality of the processor interface 112 and the router 110. The processor contains a common Generic Data Interface (GDI) 120 for communicating signaling messages with the ISCP over the common channel signaling network. Data communication by the gateway router of both signaling and information content through the Internet (or other equivalent packet network) occurs through TCP/IP protocol 124, packets being transmitted and received through physical transport layer 126. The physical transport layer may comprise Asynchronous Transfer Mode (ATM), frame relay or some other type of data communication mode.

While message and signaling communication with the common channel signaling network occurs through the GDI, communication of voice data is made through the Channel Serving Unit, Digital Serving Unit (CSU/DSU) 128. This unit, which may physically comprise a digital line card in the processor with standard 24 digital voice line inputs, packetizes voice data received from the telephone central office. The CSU/DSU coordinates with route determination unit 130 to identify packets, termination phone numbers and routes to the network termination gateway router. The route determination information is included in each packet for the data received from the originating central office SSP. The packetized data is compressed in accordance with stored algorithm 132, before being sent to the TCP/IP stack and physical transport layer for transmission to the far end gateway router. To complete transmission to the destination telephone, the termination router decompresses the received packets, depacketizes back to voice data which is then routed to the destination PSTN. Two way capability for each of the functions is provided for communication in both directions. While shown for illustrative purposes as separate blocks, the route determination and compression/decompression functions, as well as the quality test application, may be run, for example, by a UNIX-based computer.

Figure 6A:
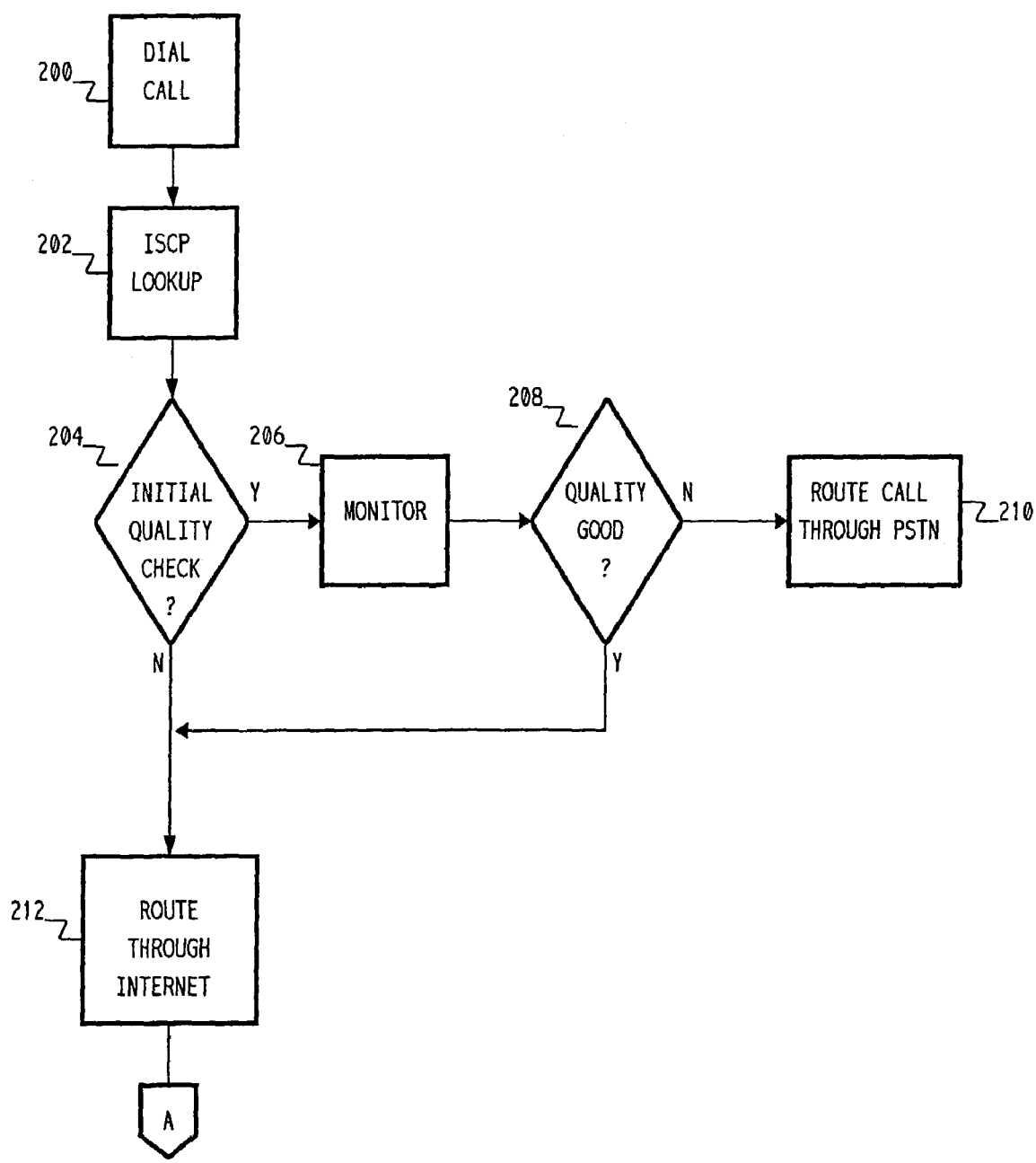
FIGS. 6A and 6B taken together form a simplified flow chart that illustrates operation of preferred embodiments of the invention.
Figure 6B:
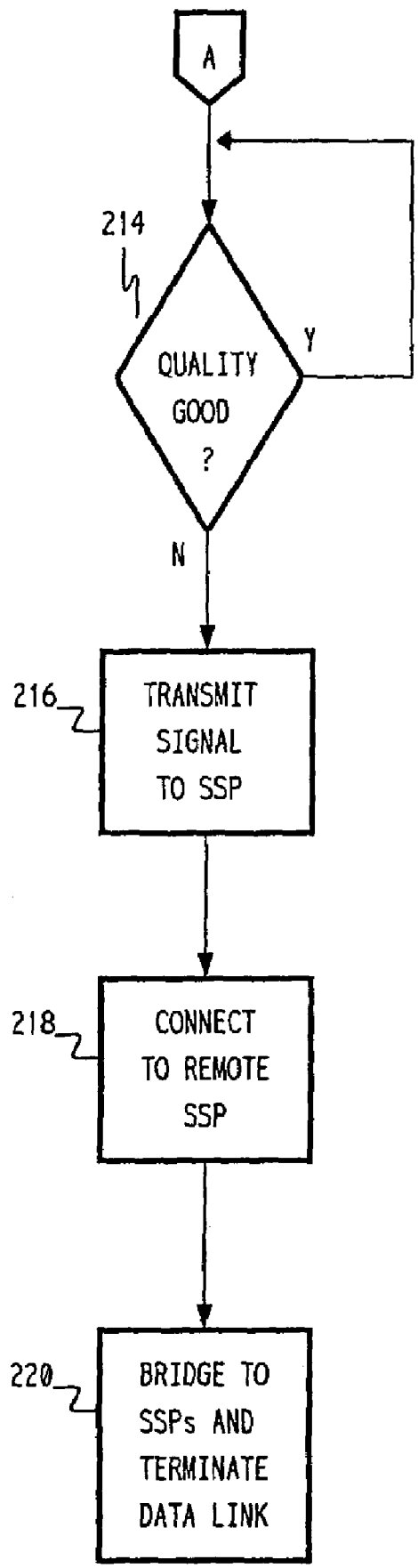

FIGS. 6A and 6B taken together form a simplified flow chart that illustrates operation of preferred embodiments of the invention. At step 200, a voice call is placed, for example, by calling telephone station 11, connected to central office SSP switch 13, to telephone station 15, connected to central office SSP switch 17. The dialing information indicates that the call is to be routed through the Internet. The specific manner in which dialed input is used to designate such routing may be in any of several alternatives, as more fully described in the aforementioned applications, Ser. Nos. 08/634,543 and 08/670,908. For example, a data network routing designation for a call may be made on a per call basis, by using a unique entry code, such as *82, or the caller may dial a virtual number, thereafter entering the destination telephone number. Alternatively, the caller's CPR may store criteria for routing all calls dialed to specifically identified destination numbers or area codes through a data network such as Internet. Preselected conditions can include any combination of time of day, day of week, destination areas, or specific destination telephone numbers. Of course, the CPR may be set to attempt Internet routing for all interlata calls if so desired. Calls that are not designated Internet type calls are processed in routine fashion through the PSTN network.

At step 202, call processing for an Internet type call is temporarily suspended by SSP 13, which then transmits a TCAP query message to the ISCP through the STP 31. The ISCP will access the caller's CPR for information as to how to handle the call, including information as to alternate network routing and predefined acceptable data network performance level.

Before continuing routing of the call from the SSP 13, it is determined at step 204 whether the current performance quality through the Internet network is to be compared with the prestored threshold level of acceptability. Checking of these conditions for the purpose of initially routing the call between central office SSPs 13 and 17 alternatively through the Internet or the PSTN network is the subject of disclosure of the aforementioned application Ser. No. 08/821,027 filed Mar. 19, 1997 and entitled Voice Call Alternative Routing Through PSTN And Internet Networks, incorporated herein by reference. As more fully described therein, if an initial quality check is to be performed, the Internet module 92 will receive a prompt message from the ISCP, through the GDI, with the appropriate information. A quality test application in the processor is then initiated for determining whether a call is to be routed through the Internet, at step 206. Performance level monitoring may be performed in a variety of ways. For example, a service test may comprise the sending of a rudimentary signal, known in the art as a "ping" signal, from the local router to the destination router and measuring the response time. The test signal generated by the quality test application is formatted for transport through physical layer 126 and the Internet to the destination end gateway router. If the monitored performance level is found to be unsatisfactory in step 208, the Internet module will issue a signal to the SSP 13 to route the call in routine fashion through the PSTN at step 210.

If it is determined at step 204 that no initial quality check is to be made, or if successful performance quality has been determined at step 208, then routing of the call through the Internet is set up at step 212. The call processing set up continues at SSP 13, which may first determine, either through the SS7 network or through the Internet, whether the call destination station is busy. If the destination station is available, router 110 in Internet module 92 will transmit a message to the destination router in Internet module 94 to initiate a call through SSP 17 in the destination PSTN to the destination station. The path for transmission of the voice data through the data network will have been determined by the CSU/DSU unit 128, in conjunction with route destination unit 130. The call is connected to appropriate CSU/DSU ports in the routers of each of the Internet modules. Quality level criteria, obtained by access of the caller's CPR in the ISCP, will have been downloaded to the GDI at Internet module 92 for use with the quality test application functionality.

While the call is in progress performance quality of the data network is continually monitored under control of the quality test application in Internet module 92. Monitoring of data network performance may be undertaken in step 214 in several alternative ways. During silent intervals in transmission of a call, ping request packets may be transmitted from Internet module 92 and the round trip time duration for receiving response packets measured. The number of voice data packet pulses received per unit time period from the Internet by module 92 is a measure of data flow rate. The time variance between voice data packets received from the Internet at the module 92 is a further indication of performance. The sequence of voice data packets received at module 92 can be checked, the frequency of missed or dropped packets determined. All of these monitored variables can be correlated to a corresponding data rate that can be compared with the predefined acceptable rate for the call received by the module 92 from the ISCP CPR of the calling subscriber. All of these measurements are within the inherent capability of a gateway router, many of which are performed during normal data transmission for other purposes. The quality test application thus can apply a plurality of repetitive test criteria to determine acceptable quality during the course of the call.

As long as the data network performance quality remains acceptable, as monitored repetitively at step 214, transmission will continue through the Internet. If the performance level is found to be unsatisfactory at step 214, the module 92 transmits a control signal to SSP 13 at step 216. At step 218 a connection for the call is established through the PSTN network between SSP 13 and SSP 17. The physical connection to the SSPs may be 3-way or so-called "no-trunk" paths, that are commonly used for conference calls or testing. Set up of this connection preferably is made through the SS7 network if such functionality is available. Alternatively, in-band signaling, either through PSTN or through the Internet from SSP 13 to SSP 17 may take place. Effectively, the call is regenerated between the SSPs 13 and 17, while transmission concurrently takes place through the established Internet route.

At step 220, the lines from stations 11 and 15 are bridged to the respective SSPs 13 and 17 in a seamless manner, without application of audible ringing or ringback signals. Transmission through the Internet is then terminated and communication of the call continues through the established PSTN connection.

As a result of the operation of this invention, quality of communication can be assured during the course of a phone call, while the need to terminate an existing call and thereafter redial a new call through an alternative rout, with the accompanying annoyance, are avoided. It can be appreciated that this invention will ensure quality of voice communication while taking advantage of available network economies. Only the preferred embodiments of the invention and but a few examples of its versatility are shown and described in the present disclosure. It is to be understood that the invention is capable of use in various other combinations and environments and is capable of changes or modifications within the scope of the inventive concept as expressed herein. For example, while rerouting of a call has been disclosed to be a dynamic process automatically responsive to monitored conditions, the AIN network of the invention can be implemented to be responsive to user input, for example DTMF, during the call. A caller at telephone 11, if desirous of improving the perceived communication quality, can depress the "*" or the like to effect rerouting through the PSTN network. The DTMF input would be recognized by the module 92, which would then generate a signal to the SSP 13 in the same manner as if quality were to be found deficient in step 214. Module 92 can also be made responsive to such DTMF input from station 15, thereby permitting either party to upgrade the call quality. As a further modification, several data rates may be stored in a subscriber's CPR, for example 2.4 kps., 4.8 kps., and 9.6 kps., with one of the rates as a default. Various DTMF signals can be allocated respectively to each of the stored rates. Input of one of the DTMF choices during a call can effect a change in the level with which the performance monitored level is compared. Internet module 92 may obtain the necessary correlating information between DTMF signal and performance level for the quality test application from the ISCP either during the initial access in step 202, or can access the ISCP in response to recognition of receipt of the DTMF input.

We claim:

1. A method of controlling voice communication between calling and called telephone stations each connected through a respective switch to a public switched telephone network (PSTN) region and remotely located from each other, comprising the steps of:
    routing a voice call carrying two-way voice communication between said calling and called stations in digital packet format through a path of the Internet;
    changing the routing of said call between said calling and called stations from the Internet path to a circuit switched network path without terminating the call, thereby bypassing said packet data network while maintaining the voice communication call; and
    wherein said changing step is responsive to a signal input by one of said stations.

2. A method as recited in claim 1, wherein said signal is input by a user.

3. A method as recited in claim 2, wherein said signal is a DTMF signal.

4. A method as recited in claim 1, wherein said signal is activated when a response time between said calling and called stations is greater than a predetermined threshold.

5. A method as recited in claim 4, wherein said response time is determined by a traversal time of a test signal sent between said calling and called stations.

6. A communications system comprising:
    a public switched telecommunications network (PSTN) having a plurality of interconnected central office switching systems each connected to at least one subscriber line;
    a public data network separate from said switched telecommunications network comprising multiple remotely spaced routers for linking together paths of said public data network using transmission control protocols to provide connectionless packet service between remote locations of said public data network;
    at least two of said central office switching systems connected to a respective interface to said public data network, said central office switching systems providing selective connection between said interfaces and the subscriber lines connected to each of said central office switching systems;
    means for rerouting a voice call between subscriber lines of said two central office switching systems that traverse said public data network to a circuit switched network path in said PSTN in response to a predetermined condition, without terminating the existing voice call; and
    wherein said predetermined condition is receipt of a signal input from one of said subscriber lines.

7. A system as recited in claim 6, wherein said signal is input by a user.

8. A system as recited in claim 7, wherein said signal is a DTMF signal.

9. A system as recited in claim 6, wherein said signal is activated when a response time between said central office switching systems is greater than a predetermined threshold.

10. A system as recited in claim 9, wherein said response time is determined by a traversal time of a test signal sent between said central office switching systems.

11. A communications system comprising:
    a public switched telecommunications network (PSTN) having a plurality of interconnected central office switching systems each connected to at least one subscriber line;
    a public data network separate from said switched telecommunications network comprising multiple remotely spaced routers for linking together paths of said public data network using transmission control protocols to provide connectionless packet service between remote locations of said public data network;
    at least two of said central office switching systems connected to a respective interface to said public data network, said central office switching systems providing selective connection between said interfaces and the subscriber lines connected to each of said central office switching systems; and
    means for automatically rerouting a voice call between subscriber lines of said two central office switching systems that traverse said public data network to a non-packet data format voice path in said PSTN in response to a predetermined condition, without terminating the existing voice call;
    wherein said predetermined condition is the occurrence of an unacceptable level of quality of performance of said public data network, and each said interface comprises means for monitoring said data network during the course of transmission of said voice call through said public data network.

12. A communications network comprising:

a switched telecommunications network having interconnected central office switching systems and having subscriber lines connected to said central office switching systems providing connection between terminals connected to said subscriber lines, each of said central office switching systems responding to a service request on a subscriber line connected thereto to selectively provide a communication connection between the requesting line and another selected subscriber line through the switched telecommunications network;

a separate control network for said switched telecommunications network comprising a common channel interoffice signaling network including signal transfer points connected to said central office switching systems through signal switching points via links between said signal switching points and signal transfer points;

a public data network separate from said switched telecommunications network comprising multiple remotely spaced routers for linking together paths of said public data network using transmission control protocols to provide connectionless packet service between remote locations of said public data network;

at least two of said central office switching systems having connected thereto an interface to said public data network, said central office switching systems providing selective connection between said interfaces and the subscriber lines connected to each of said central office switching systems;

each said interface comprising means for monitoring said public data network during the course of two-way voice communication of a voice call between a first and a second of said subscriber lines through said public data network to determine a quality of performance level in said public data network, and means for providing a signal to said control network indicating that said performance level is unacceptable; and wherein said public data network is the Internet and said control network is responsive to said signal to reroute said voice call through said switched telecommunications network to bypass the Internet while maintaining the two-way voice communication call.

13. A communication network as recited in claim 12, wherein said central office switching systems comprise means responsive to said control network for bridging said first and second subscriber lines to the rerouted switched telecommunications path.

14. A method of controlling voice communication between calling and called telephone stations each connected through a respective switch to a public switched telephone network (PSTN) region and remotely located from each other, comprising the steps of:

routing a voice call carrying two-way voice communication between said calling and called stations in digital packet format through a path of the Internet; and changing the routing of said call between said calling and called stations from the Internet path to a non-packet data format voice telephone network voice path without terminating the call, thereby bypassing said packet data network while maintaining the voice communication call;

wherein said changing step comprises:

monitoring said packet data network during the course of transmission of said voice call through said packet data network path to determine a quality of performance level;

comparing the performance level determined in said monitoring step with a predetermined threshold level; and rerouting the call to said voice telephone network voice path if the performance level of said packet data network as monitored in said monitoring step is below said predetermined threshold.

* * * * *